United States Patent
Yueda

(10) Patent No.: US 12,283,706 B2
(45) Date of Patent: Apr. 22, 2025

(54) ELECTRIC WORK MACHINE

(71) Applicant: MAKITA CORPORATION, Anjo (JP)

(72) Inventor: Ryuki Yueda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 780 days.

(21) Appl. No.: 17/343,365

(22) Filed: Jun. 9, 2021

(65) Prior Publication Data

US 2022/0021065 A1 Jan. 20, 2022

(30) Foreign Application Priority Data

Jul. 14, 2020 (JP) .................................. 2020-120812
Mar. 12, 2021 (JP) .................................. 2021-040616

(51) Int. Cl.
| | | |
|---|---|---|
| H01M 50/00 | (2021.01) | |
| B01F 31/00 | (2022.01) | |
| B01F 35/32 | (2022.01) | |
| B25D 16/00 | (2006.01) | |
| B25F 5/00 | (2006.01) | |
| E04G 21/06 | (2006.01) | |
| H01M 50/267 | (2021.01) | |
| H02K 11/00 | (2016.01) | |
| B01F 101/28 | (2022.01) | |

(52) U.S. Cl.
CPC .......... *H01M 50/267* (2021.01); *B01F 31/70* (2022.01); *B01F 35/32025* (2022.01); *B01F 35/3204* (2022.01); *B25D 16/00* (2013.01); *B25F 5/00* (2013.01); *E04G 21/063* (2013.01); *H02K 11/0094* (2013.01); *B01F 2101/28* (2022.01)

(58) Field of Classification Search
CPC .......................... H01M 50/267; H01M 2220/30
See application file for complete search history.

(56) References Cited

U.S. PATENT DOCUMENTS

| | | | | |
|---|---|---|---|---|
| 2012/0061117 A1* | 3/2012 | Nagasaka | ............. | H01M 50/24 173/217 |
| 2015/0333301 A1* | 11/2015 | Ota | ........................ | H02J 7/0063 429/91 |
| 2021/0367305 A1* | 11/2021 | Wrobel | ............... | H01M 50/247 |
| 2023/0264337 A1* | 8/2023 | Suzuki | .................... | B25F 5/008 173/217 |

FOREIGN PATENT DOCUMENTS

| | | | | | |
|---|---|---|---|---|---|
| CN | 113927545 A | * | 1/2022 | .......... | B01F 11/0097 |
| JP | 2012-081576 A | | 4/2012 | | |
| JP | 2013-088951 A | | 5/2013 | | |
| JP | 2020-006288 A | | 1/2020 | | |
| WO | WO-2019111668 A1 | * | 6/2019 | ............ | H01M 50/20 |

OTHER PUBLICATIONS

Jul. 2, 2024 Office Action issued in Japanese Patent Application No. 2021-040616.

* cited by examiner

*Primary Examiner* — Eyamindae C Jallow
(74) *Attorney, Agent, or Firm* — Oliff PLC

(57) ABSTRACT

An electric work machine allows use of batteries with different sizes with battery covers and allows easy maintenance of a damaged battery cover. A rechargeable concrete vibrator includes a motor, a motor housing accommodating the motor, a battery holder connected to the motor housing to receive a battery in a detachable manner, and a battery cover to cover an overall part of the battery held by the battery holder. The battery cover is attachable to and detachable from the battery holder.

22 Claims, 26 Drawing Sheets

ELECTRIC WORK MACHINE

CROSS-REFERENCE TO RELATED APPLICATIONS

This application claims the benefit of priority to Japanese Patent Application No. 2020-120812, filed on Jul. 14, 2020, and Japanese Patent Application No. 2021-040616, filed on Mar. 12, 2021, the entire contents of which are hereby incorporated by reference.

BACKGROUND

1. Technical Field

The present disclosure relates to an electric work machine powered by a battery.

2. Description of the Background

Known electric work machines powered by attached batteries include rechargeable driver drills and rechargeable concrete vibrators. Such a rechargeable electric work machine may have a cover to protect its attached battery. In a rechargeable mixer described in, for example, Japanese Unexamined Patent Application Publication No. 2020-6288, a battery holder in a body housing includes a battery cover to cover an attached battery pack (battery). The battery cover is hinged to the battery holder in an openable manner.

BRIEF SUMMARY

A known battery cover is designed for a single battery size and cannot be used for larger batteries. A battery cover designed for a largest possible battery can upsize the entire machine.

Once such a cover is damaged, its replacement or other maintenance involves complicated and time-consuming tasks.

One or more aspects of the present disclosure are directed to an electric work machine that allows use of batteries with different sizes with battery covers and allows easy maintenance of a damaged battery cover.

One or more other aspects of the present disclosure are directed to an electric work machine that entirely remains compact with a larger battery and allows easy maintenance of a damaged battery cover.

A first aspect of the present disclosure provides an electric work machine, including:
 a motor;
 a motor housing accommodating the motor;
 a battery holder connected to the motor housing to receive a battery in a detachable manner; and
 a battery cover to cover an overall part of the battery held by the battery holder, the battery cover being attachable to and detachable from the battery holder.

A second aspect of the present disclosure provides an electric work machine, including:
 a motor;
 a motor housing accommodating the motor; and
 a battery holder connected to the motor housing to receive a battery in a detachable manner, the battery holder being configured to selectively receive a first battery or a second battery larger than the first battery in a detachable manner, the battery holder being configured to selectively receive a first battery cover to cover an overall part of the first battery or a second battery cover to cover an overall part of the second battery in a detachable manner.

The electric work machine according to the above aspects of the present disclosure allows use of batteries with different sizes.

The electric work machine according to the above aspects of the present disclosure entirely remains compact with a larger battery and allows easy maintenance of a damaged battery cover.

DETAILED DESCRIPTION

Embodiments of the present disclosure will now be described with reference to the drawings.

First Embodiment

Figure 1:
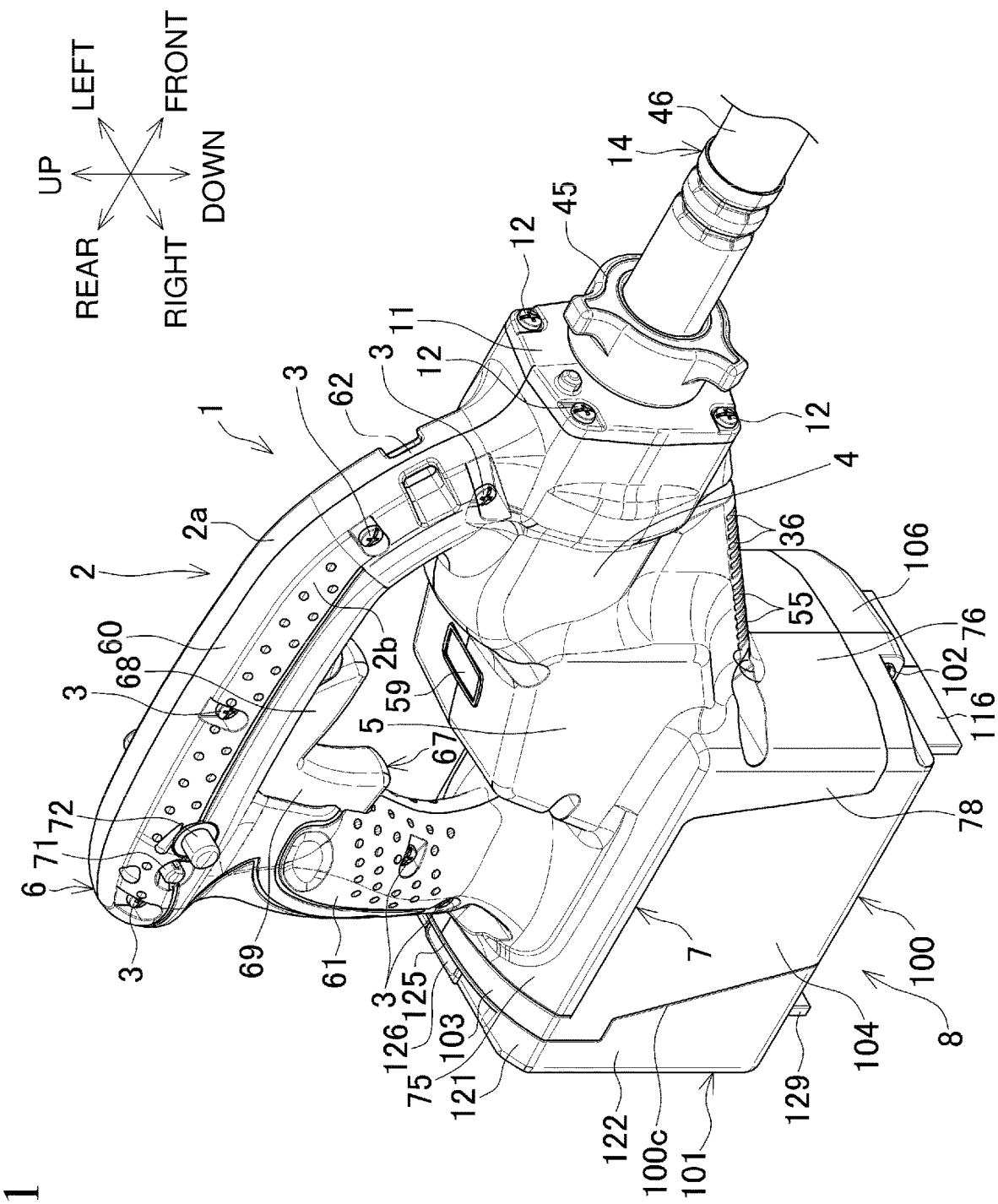
FIG. 1 is a perspective view of a rechargeable concrete vibrator according to a first embodiment.
Figure 2:
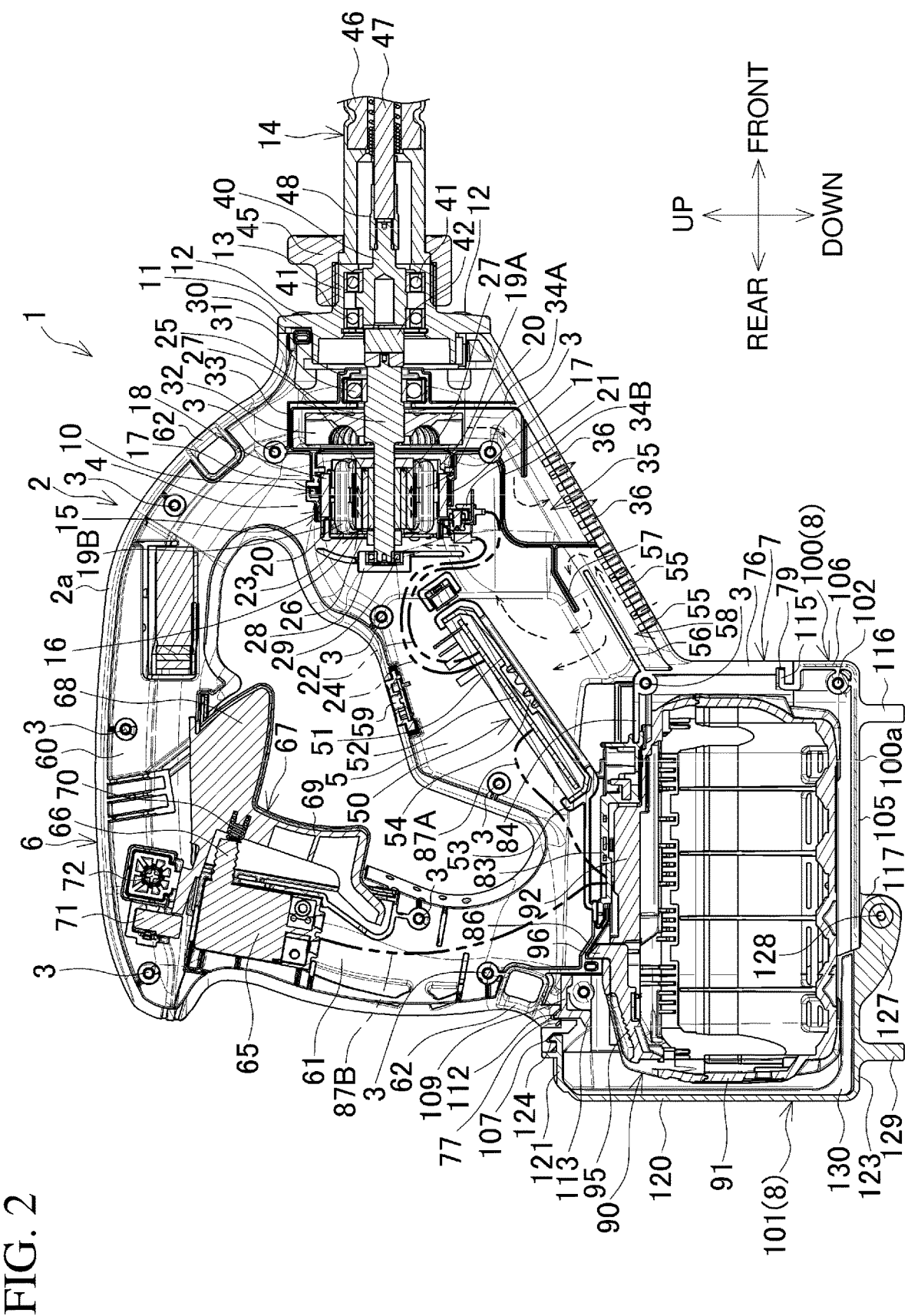
FIG. 2 is a longitudinal central sectional view of the rechargeable concrete vibrator according to the first embodiment.

FIG. 1 is a perspective view of a rechargeable concrete vibrator (hereafter, a concrete vibrator) as an example of an electric work machine according to a first embodiment of the present disclosure. FIG. 2 is a longitudinal central sectional view of the concrete vibrator.

A concrete vibrator 1 includes a body housing 2. The body housing 2 includes left and right housing halves 2a and 2b. The left and right housing halves 2a and 2b are assembled together with multiple screws 3 screwed from the right. The body housing 2 includes a motor compartment 4, a controller compartment 5, a grip 6, and a battery holder 7. The battery holder 7 receives a battery cover 8 in a detachable manner.

The motor compartment 4 is a cylinder extending in the front-rear direction and accommodates a motor 10. The motor compartment 4 receives a front cover 11 attached to its front end. The front cover 11 is fastened to the motor compartment 4 with multiple screws 12 screwed from the front. The front cover 11 includes a cylinder 13 at its center. The cylinder 13 receives a vibrating rod 14 connected to its distal end.

The motor 10 is an inner-rotor brushless motor including an outer stator 15 and a rotor 16 located inside the stator 15. The motor 10 is accommodated in a posture with a rotational shaft 25 inside the rotor 16 extending in the front-rear direction.

The stator 15 is supported between upper and lower support ribs 17 raised from the inner surfaces of the left and right housing halves 2a and 2b. The stator 15 includes a stator core 18 and insulators 19A and 19B. The insulators 19A and 19B are located in the front and the rear of the stator core 18. The stator core 18 includes multiple coils 20 wound around the stator core 18 with the insulators 19A and 19B between them. The coils 20 are in a three-phase connection on the rear insulator 19B. Three-phase power wires 22 extend from a connector 21 that is fastened by screwing to the lower end of the insulator 19B. The power wires 22 extend above a controller 50 inside the controller compartment 5 to be connected to the upper surface of a control circuit board 52. The rear insulator 19B receives a sensor circuit board 23 including rotation detecting elements (not shown) that are fastened by screwing to its rear surface. Signal wires 24 extending from the lower end of the sensor circuit board 23 also extend above the controller 50 to be connected to the upper surface of the control circuit board 52.

The rotor 16 includes the rotational shaft 25, a rotor core 26, and multiple permanent magnets 27. The rotor core 26 surrounds the rotational shaft 25. The multiple permanent magnets 27 are fixed to the rotor core 26. The rotational shaft 25 has its rear end supported rotatably by a rear bearing holder 28 that is raised from the inner surfaces of the housing halves 2a and 2b with a bearing 29 between them. The rotational shaft 25 has, behind the front cover 11, its front end supported rotatably by a front bearing holder 30 that is raised from the inner surfaces of the housing halves 2a and 2b with a bearing 31 between them.

A fan 32 is fixed to the rotational shaft 25 between the stator 15 and the bearing 31. The fan 32 is surrounded by an upper partition rib 33 and front and rear lower partition ribs 34A and 34B that are separate from each other. The upper partition rib 33 is raised from the inner surfaces of the housing halves 2a and 2b between the upper support rib 17 and the front bearing holder 30. The lower partition ribs 34A and 34B are raised also from the inner surfaces of the housing halves 2a and 2b. The front lower partition rib 34A extends downward from the front bearing holder 30 to connect to the lower inner surface of the body housing 2, and then extends rearward. The rear lower partition rib 34B extends downward from the lower support rib 17, and then bends rearward. The rear lower partition rib 34B then bends downward to connect to the lower inner surface of the body housing 2 between the motor compartment 4 and the controller compartment 5. This structure defines an outlet channel 35 connecting to the fan 32 between the lower partition ribs 34A and 34B. The body housing 2 has multiple outlets 36 in its lower surface that serves as a downstream end of the outlet channel 35.

The cylinder 13 in the front cover 11 receives a spindle 40 supported by a bearing 41. The spindle 40 is located in front of and coaxially with the rotational shaft 25, and is coupled to the rotational shaft 25 with a joint 42. The spindle 40 has its front end protruding frontward from the cylinder 13.

The vibrating rod 14 receives a fixing cap 45 on its rear end. The vibrating rod 14 is attached to the cylinder 13 with the fixing cap 45 fastened to the cylinder 13 by screwing. The vibrating rod 14 includes an outer flexible hose 46 and a flexible shaft 47. The flexible shaft 47 is located in an internal space of the flexible hose 46. The flexible shaft 47 receives an unbalanced weight (not shown) connected to its distal end. The flexible hose 46 receives a cap (not shown) covering its distal end. The flexible shaft 47 has its rear end connected coaxially to the front end of the spindle 40 with a joint sleeve 48 between them.

The controller compartment 5 is in a tilted posture extending downward and rearward from the motor compartment 4. The controller compartment 5 accommodates the controller 50. The controller 50 includes a case 51 and the control circuit board 52. The control circuit board 52 is accommodated in the case 51. The case 51 has its open portion facing upward and is formed from aluminum or another highly heat-dissipating metal. The control circuit board 52 includes a microcomputer and multiple switching elements on its upper surface. The case 51 is held by a holding rib 53 raised from the inner surfaces of the housing halves 2a and 2b. The case 51 includes, at the center of its lower surface, a heat-dissipating member 54 having multiple protrusions and recesses. The holding rib 53 holds the periphery of the case 51 excluding the heat-dissipating member 54. The controller 50 is laterally held in a tilted posture with its front end higher than its rear end.

Below the controller 50, the body housing 2 has multiple inlets 55 in its lower surface. The inlets 55 are located behind the rear lower partition rib 34B. Above the inlets 55, the housing halves 2a and 2b have a lower guide wall 56 raised from their inner surfaces. The lower guide wall 56 extends frontward and upward from a lower wall 84 in the battery holder 7. The lower guide wall 56 has its front end located behind the lower partition rib 34B. Above the lower guide wall 56, the housing halves 2a and 2b have an upper guide wall 57 raised from their inner surfaces. The upper guide wall 57 extends rearward and downward from the rear surface of the lower partition rib 34B and in parallel to the lower guide wall 56. The upper guide wall 57 has its rear end below the controller 50.

The lower guide wall 56 and the upper guide wall 57 define a U-shaped intake air flowing path 58 above the inlets 55. More specifically, air drawn through the inlets 55 moves forward along the lower guide wall 56, and is redirected by the lower partition rib 34B and the upper guide wall 57. The air moves rearward along the upper guide wall 57, and then toward the controller 50.

Above the controller 50, the controller compartment 5 includes a display panel 59 on its upper surface. The display panel 59 is electrically connected to the control circuit board 52 to indicate the battery power level of a battery pack 90.

The grip 6 includes an upper grip 60 and a lower grip 61. The upper grip 60 extends in the front-rear direction, and has its front end connected to the motor compartment 4 from above. The lower grip 61 extends vertically, and has its upper end connected to the rear end of the upper grip 60. The lower grip 61 has its lower end connected to the battery holder 7 from above. The grip 6 is thus connected to the motor compartment 4, the controller compartment 5, and the battery holder 7 in a loop. The upper grip 60 has a shoulder belt engaging portion 62 on its front upper surface. The lower grip 61 has a shoulder belt engaging portion 62 on its rear lower surface.

The lower grip 61 includes a switch 65 in its upper portion. The switch 65 includes a plunger 66 protruding frontward. A switch lever 67 is located in front of the plunger 66. The switch lever 67 has, below the switch 65, its lower end supported rotatably by the lower grip 61. The switch lever 67 is L-shaped, and includes an upper trigger 68 and a lower trigger 69. The upper trigger 68 extends in the front-rear direction. The lower trigger 69 extends vertically. A coil spring 70 is held between the plunger 66 and the switch lever 67. When an operator presses the upper trigger 68 with fingers holding the upper grip 60, the switch lever 67 swings rearward to press the plunger 66. When the operator presses the lower trigger 69 with fingers holding the lower grip 61, the switch lever 67 also swings rearward to press the plunger 66.

The upper grip 60 includes a lock button 71 above the switch 65. The lock button 71 in a normal state prevents the switch lever 67 from being pressed. The lock button 71 being pressed allows the switch lever 67 to be pressed. The upper grip 60 includes a lock-on button 72 in front of the lock button 71. When the switch lever 67 and subsequently the lock-on button 72 are pressed, the switch lever 67 remains pressed.

Figure 3:
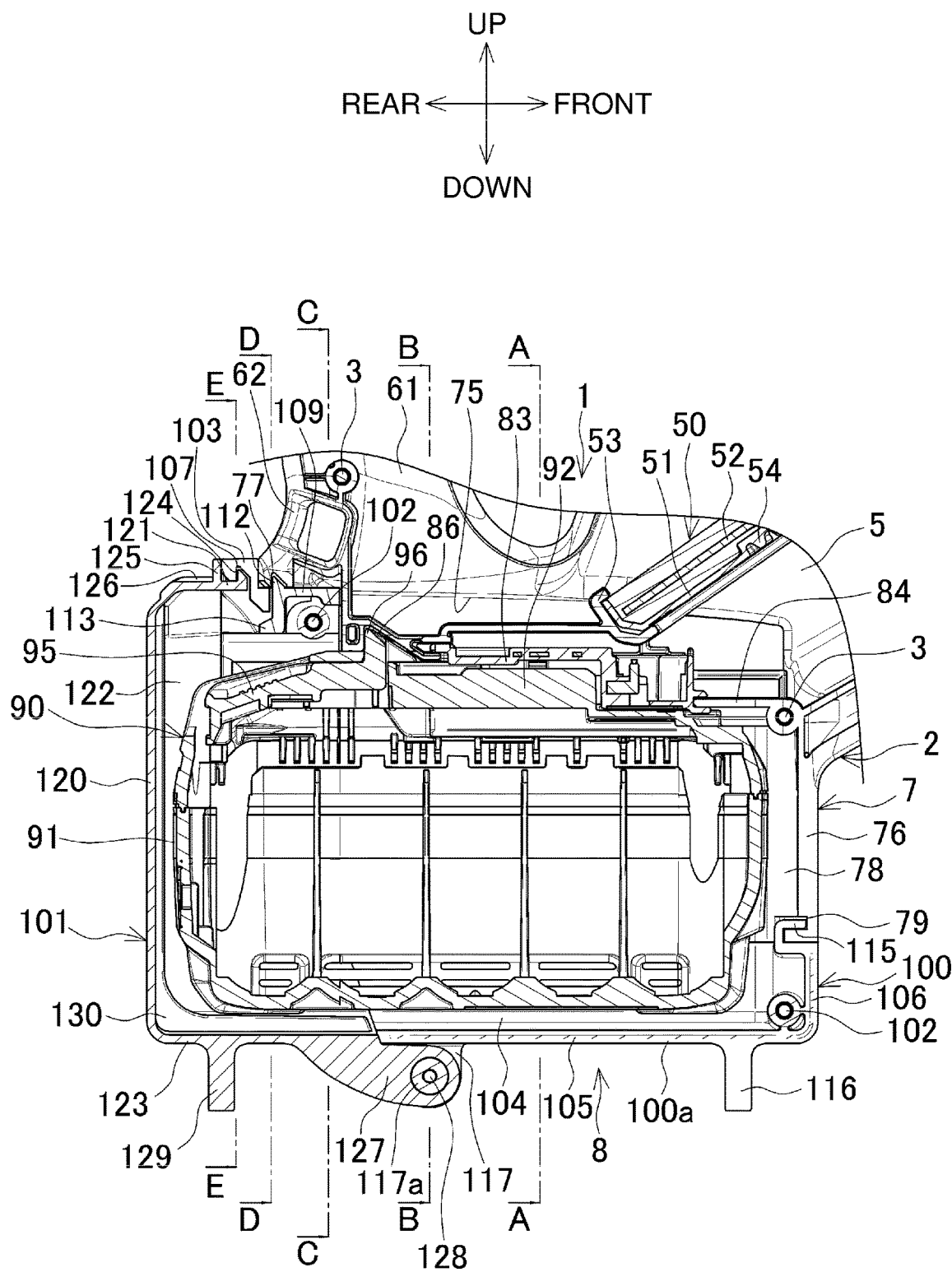
FIG. 3 is an enlarged view of a battery holder in FIG. 2.
Figure 4:
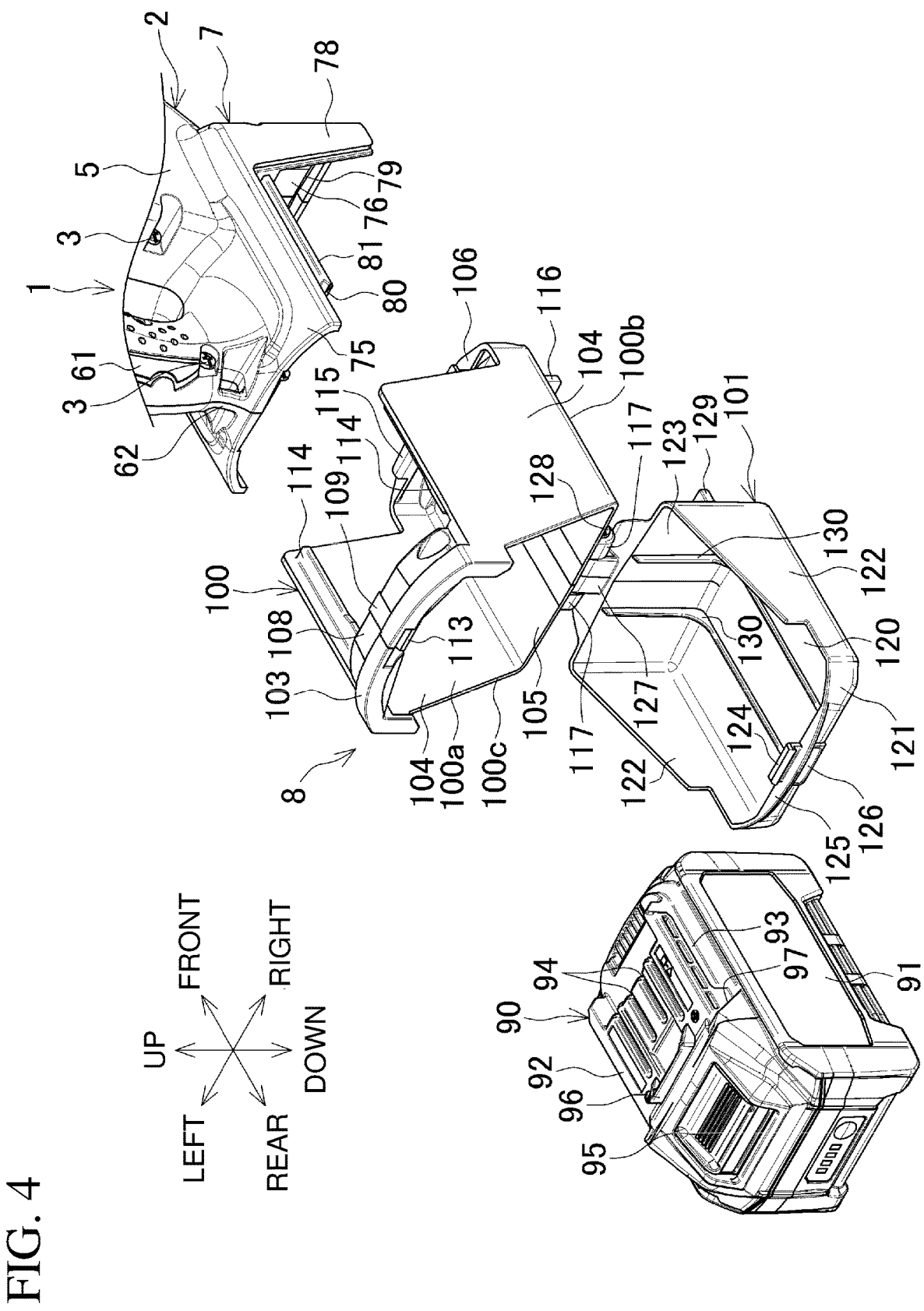
FIG. 4 is a perspective view of the battery holder, a battery cover, and a battery pack in the first embodiment as viewed from the rear.
Figure 5:
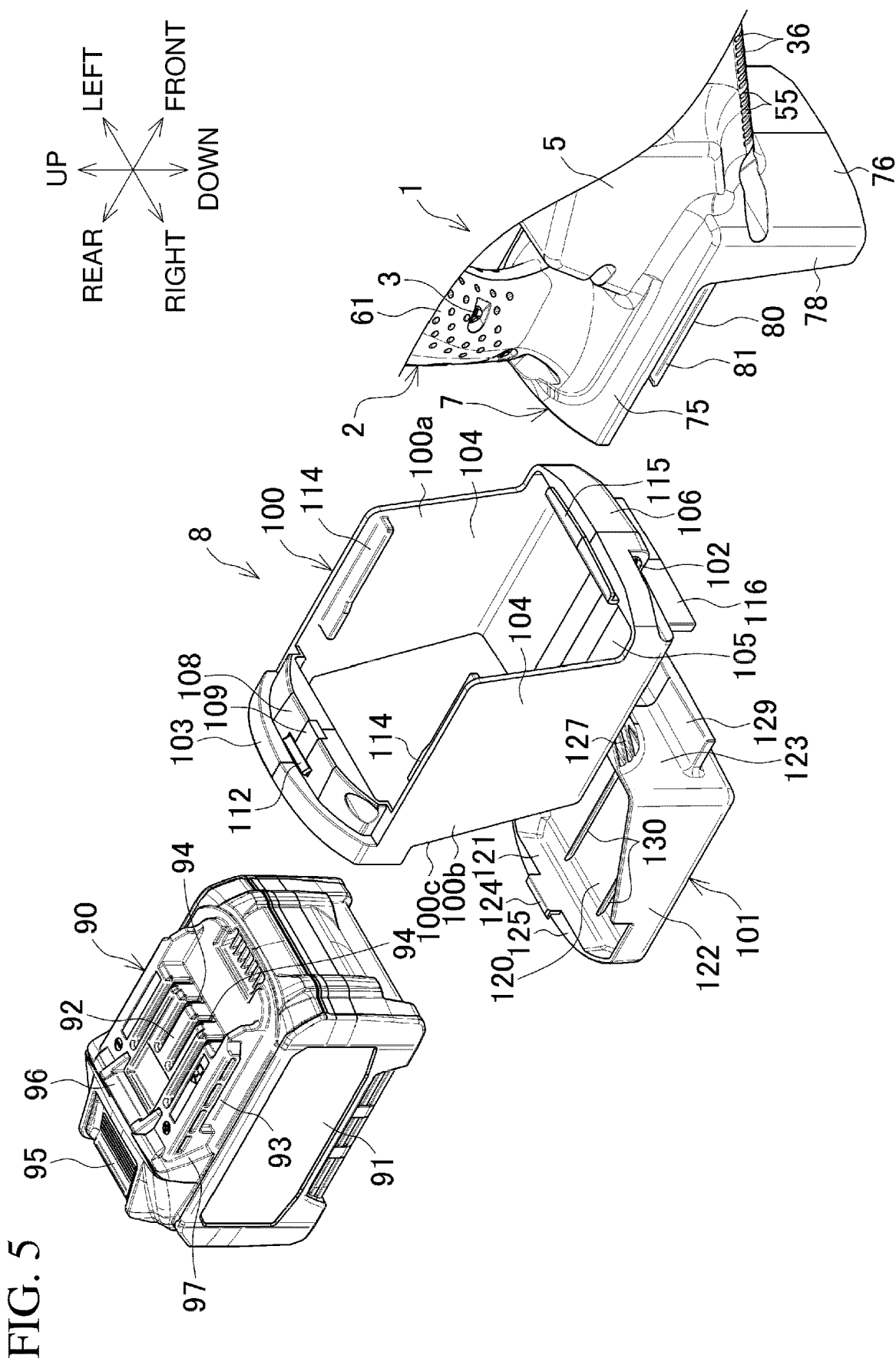
FIG. 5 is a perspective view of the battery holder, the battery cover, and the battery pack in the first embodiment as viewed from the front.

As shown in FIGS. 3 to 5, the battery holder 7 is L-shaped as viewed laterally, and includes an upper wall 75 and a front wall 76. The upper wall 75 connected to the controller compartment 5 and the lower grip 61 extends in the front-rear and lateral directions. The upper wall 75 has a larger lateral width than the controller compartment 5 and the lower grip 61. The upper wall 75 has a body cover recess 77 recessed upward at the lateral center of its rear lower surface.

The front wall 76 extends downward from the front end of the upper wall 75. The front wall 76 has the same lateral width as the upper wall 75. The front wall 76 has its front surface continuous with the lower surface of the controller compartment 5. The front wall 76 is integral with a right side wall 78 and a left side wall 78, which are short in the front-rear direction. The front wall 76 has an engaging groove 79 extending laterally on its lower rear surface.

Figure 6:
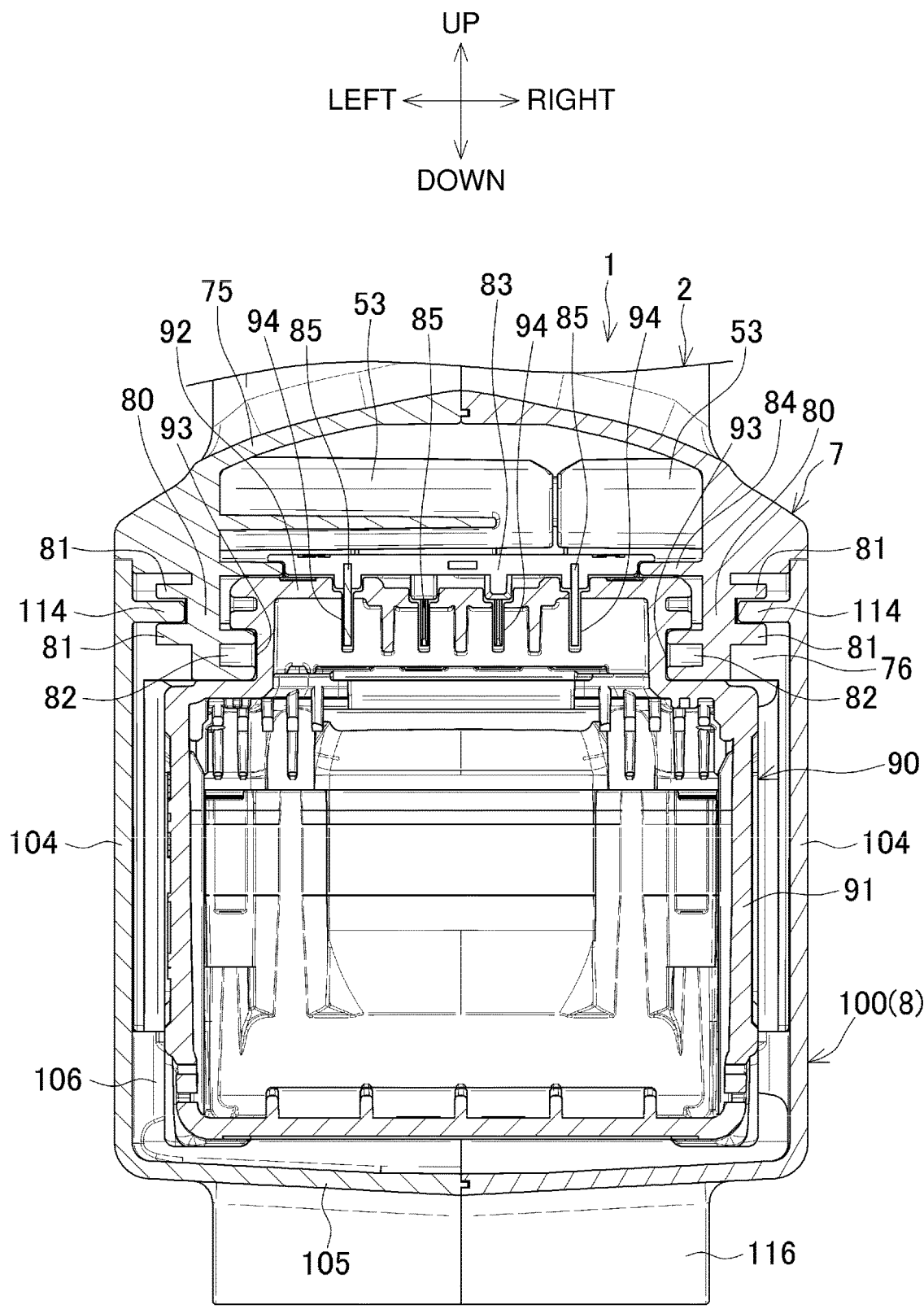
FIG. 6 is a cross-sectional view taken along line A-A in FIG. 3.

As shown in FIG. 6, the upper wall 75 includes a pair of right and left guide plates 80 on its lower surface. The guide plates 80 each are a strip extending in the front-rear direction and located slightly inward from the right or left side edges of the upper wall 75. Each guide plate 80 includes outer guide rails 81 on its outer surface. The outer guide rails 81 extend in the front-rear direction at a predetermined vertical interval. Each guide plate 80 includes an inner guide rail 82 extending in the front-rear direction on its lower end inner surface.

The pair of guide plates 80 hold a terminal mount 83 between them. A lower wall 84 extends between the upper inner surfaces of the right and left guide plates 80. The terminal mount 83 is held by the lower wall 84 in a posture extending in the front-rear direction. The terminal mount 83 includes, on its lower surface, multiple terminal plates 85 protruding in the front-rear direction. Behind the terminal mount 83, the lower wall 84 has a battery recess 86 recessed upward on its lower surface. The terminal mount 83 receives lead wires 87A and 87B. The lead wire 87A is connected to the control circuit board 52. The lead wire 87B is connected to the switch 65. Each wire is indicated by a simple two-dot chain line in FIG. 2.

The battery holder 7 can receive the battery pack 90. The battery pack 90 includes a body case 91 and a connector 92. The body case 91 accommodates multiple cells (not shown). The connector 92 is located on the upper surface of the body case 91. The connector 92 is connectable to the battery holder 7. The connector 92 has a lateral width wide enough to be fitted between the right and left guide plates 80. The connector 92 has fitting grooves 93 located in lower portions of its right and left side surfaces. Each fitting groove 93 is straight and extends rearward from the front end of the connector 92. Each fitting groove 93 is fittable with the inner guide rail 82 on the guide plate 80. The connector 92 has multiple slits 94. With the battery pack 90 being attached to the battery holder 7, the slits 94 receive terminal plates 85 on the terminal mount 83 from the front. The connector 92 includes metal terminals (not shown) at the positions of the slits 94 to be electrically connected to the terminal plates 85.

The connector 92 includes a hook button 95 in its rear portion. The hook button 95 includes a hook 96 facing upward on its front end. Inside the body case 91, the hook 96 is urged upward by a coil spring (not shown) to protrude from the connector 92. Steps 97 are located on the right and left of the hook 96. With the battery pack 90 being attached, the steps 97 are in contact with the rear ends of the guide plates 80.

The connector 92 in the upper portion of the battery pack 90 is pressed forward from the rear of the battery holder 7 between the right and left guide plates 80. The grooves 93 on the connector 92 are thus fitted to the inner guide rails 82 on the guide plates 80. When the battery pack 90 is slid forward, the terminal plates 85 on the terminal mount 83 are received in the slits 94. The battery pack 90 stops sliding when the steps 97 come in contact with the guide plates 80. In this state, the hook 96 is under the rear end of the lower wall 84 and is engaged with the battery recess 86. In this manner, the battery pack 90 is completely attached to the battery holder 7.

To detach the battery pack 90, the hook button 95 is pressed downward. The hook 96 is then disengaged from the battery recess 86, and the battery pack 90 can be slid rearward to be detached.

The battery cover 8 includes a front body cover 100 and an openable cover 101. The openable cover 101 is located behind the body cover 100, and opens or closes the rear of the body cover 100. The body cover 100 includes left and right covering halves 100a and 100b. The left and right covering halves 100a and 100b are assembled together with multiple screws 102 screwed from the right. The body cover 100 includes an upper plate 103, right and left side plates 104, a lower plate 105, and a front plate 106. The body cover 100 has a rectangular tubular shape and extends in the front-rear direction. The upper plate 103 has its rear portion connected continuously to the rear of the upper wall 75 of the battery holder 7. The upper plate 103 has an openable cover recess 107 at the lateral center of its rear lower surface.

Figure 8:
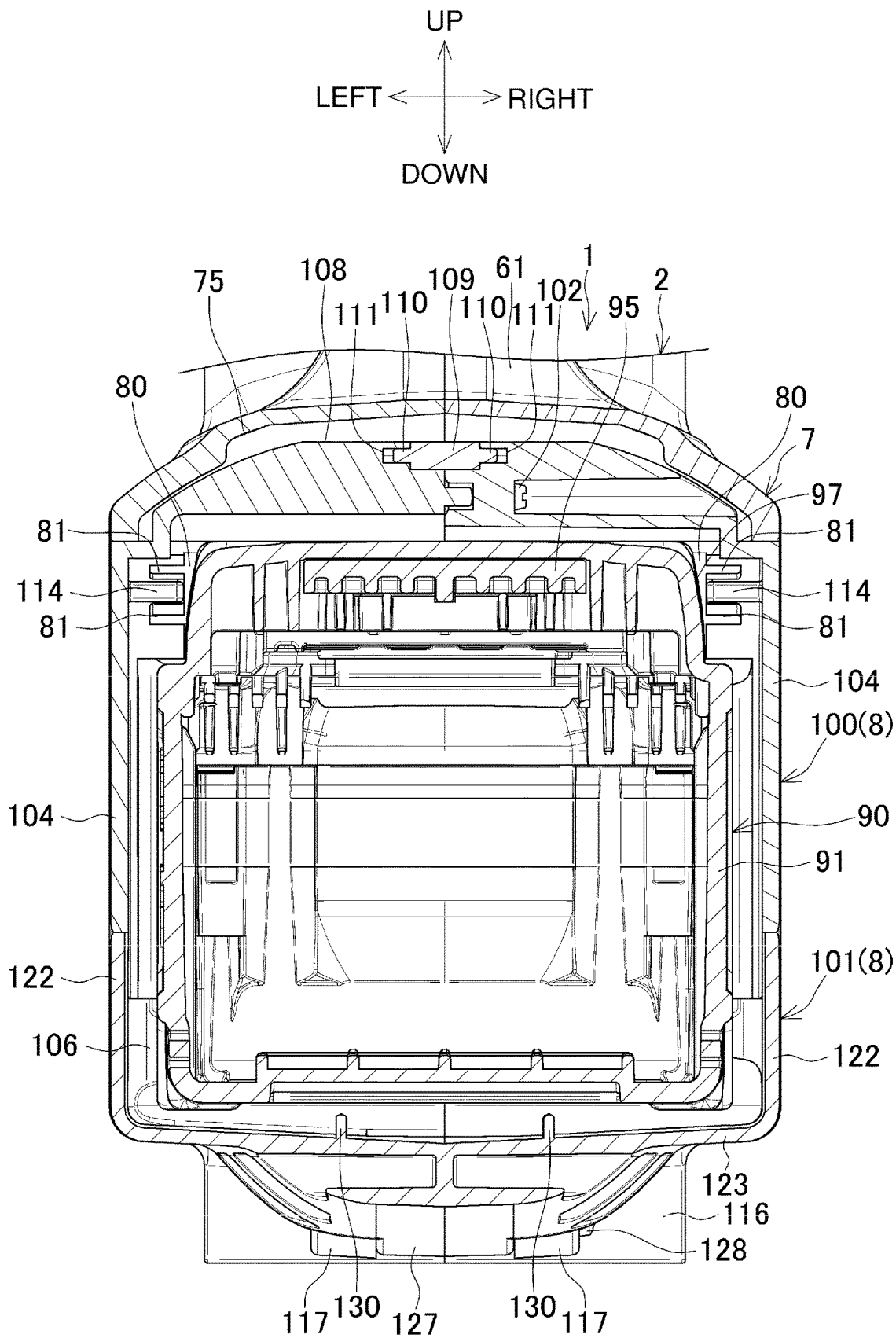
FIG. 8 is a cross-sectional view taken along line C-C in FIG. 3.
Figure 9:
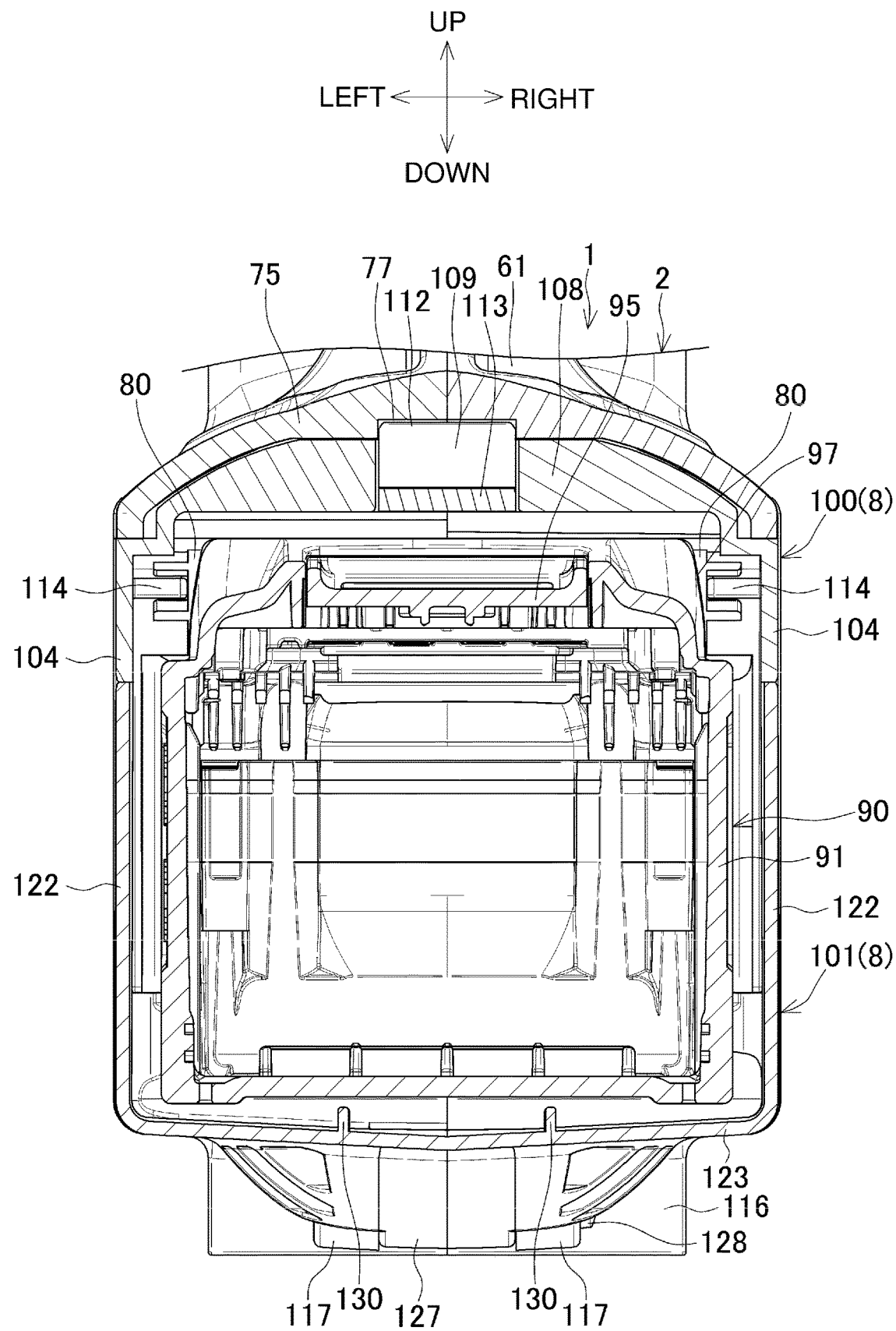
FIG. 9 is a cross-sectional view taken along line D-D in FIG. 3.

The upper plate 103 has an overlap 108 in its front portion. The overlap 108 is located lower than the rear portion of the upper plate 103, and overlaps the upper wall 75 from below. The overlap 108 includes a hook plate 109. The hook plate 109 is held between the left and right covering halves 100a and 100b. The hook plate 109 is L-shaped as viewed laterally. As shown in FIG. 8, the hook plate 109 has projections 110 on its right and left front ends. The projections 110 are placed into holes 111 in the facing surfaces of the covering halves 100a and 100b. The hook plate 109 is thus supported with its rear end being vertically swingable about the projections 110. As shown in FIGS. 5 and 9, the hook plate 109 includes, on its rear end upper surface, a body engaging tab 112 facing upward. The hook plate 109 has its rear portion protruding below the overlap 108. The hook plate 109 has, on its lower end, an operation tab 113 protruding rearward.

Each side plate 104 is connected continuously to a rear portion of the corresponding side wall 78 of the battery holder 7. The side plates 104 each have a larger vertical dimension than the side walls 78. Each side plate 104 includes a slide rail 114 extending in the front-rear direction on its upper inner surface. Each slide rail 114 is fittable between the outer guide rails 81 located on the corresponding guide plate 80 of the battery holder 7.

The front plate 106 is raised shortly from the front end of the lower plate 105 and connected continuously to the lower portion of the front wall 76. The front plate 106 includes an engaging tab 115 bent frontward on its upper end. The engaging tab 115 is engageable with the engaging groove 79 on the front wall 76.

The lower plate 105 receives a front leg 116 extending laterally and raised downward from its front lower surface. Support projections 117 facing downward are located behind the front leg 116. The left support projection 117 has a screw boss 117a.

Figure 10:
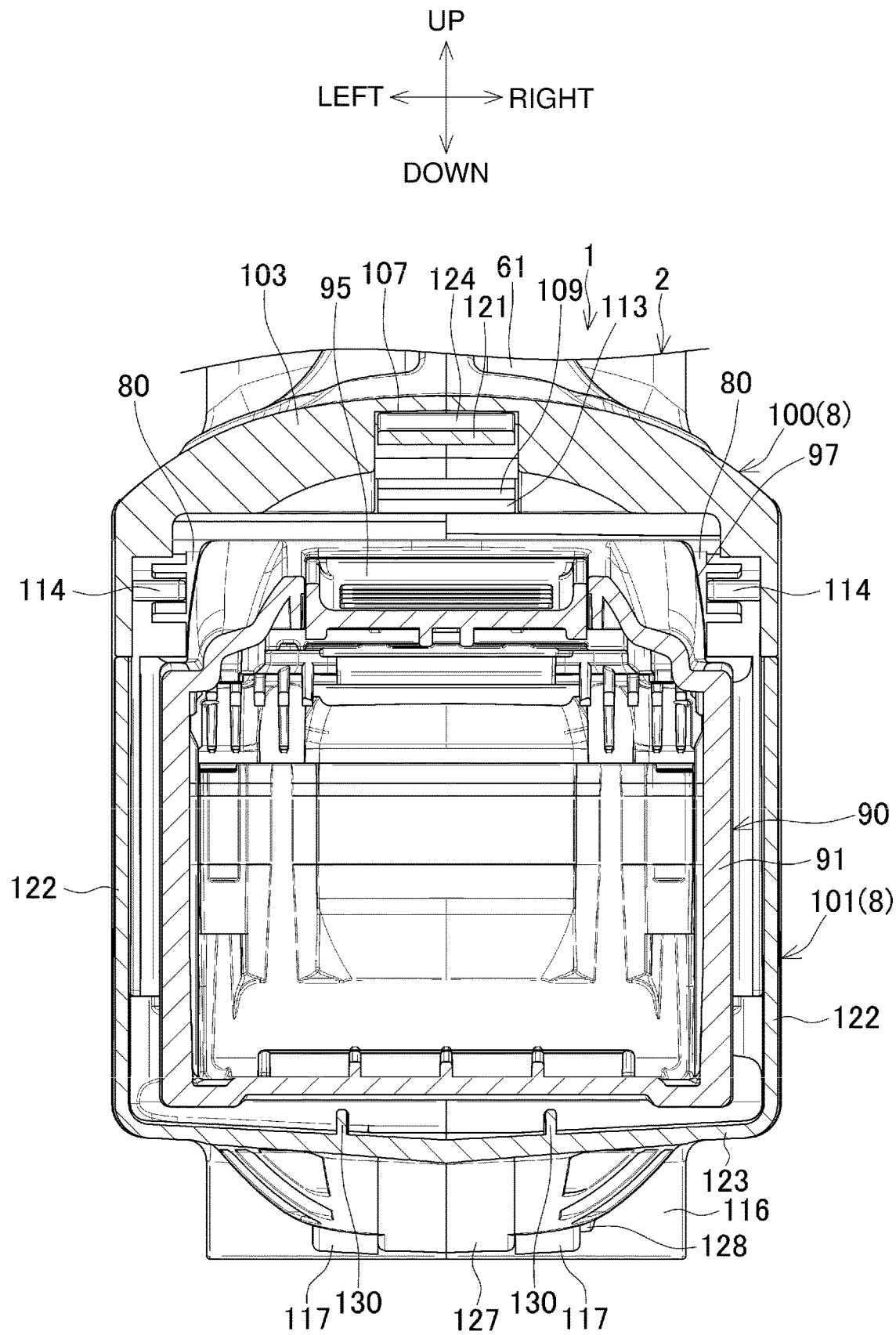
FIG. 10 is a cross-sectional view taken along line E-E in FIG. 3.

The openable cover 101 includes a rear plate 120, a rear upper plate 121, rear side plates 122, and a rear lower plate 123. The rear upper plate 121 is connected continuously to the rear of the upper plate 103 of the body cover 100. As shown in FIG. 10, the rear upper plate 121 includes a cover engaging tab 124 facing upward at the lateral center of its front end. A stopper 125 is raised laterally behind the cover engaging tab 124. An operation recess 126 is located behind the lateral center of the stopper 125. The rear side plates 122 each have the same vertical length as the side plates 104 in the body cover 100, and are connected continuously to the rear of the corresponding side plate 104.

Figure 7:
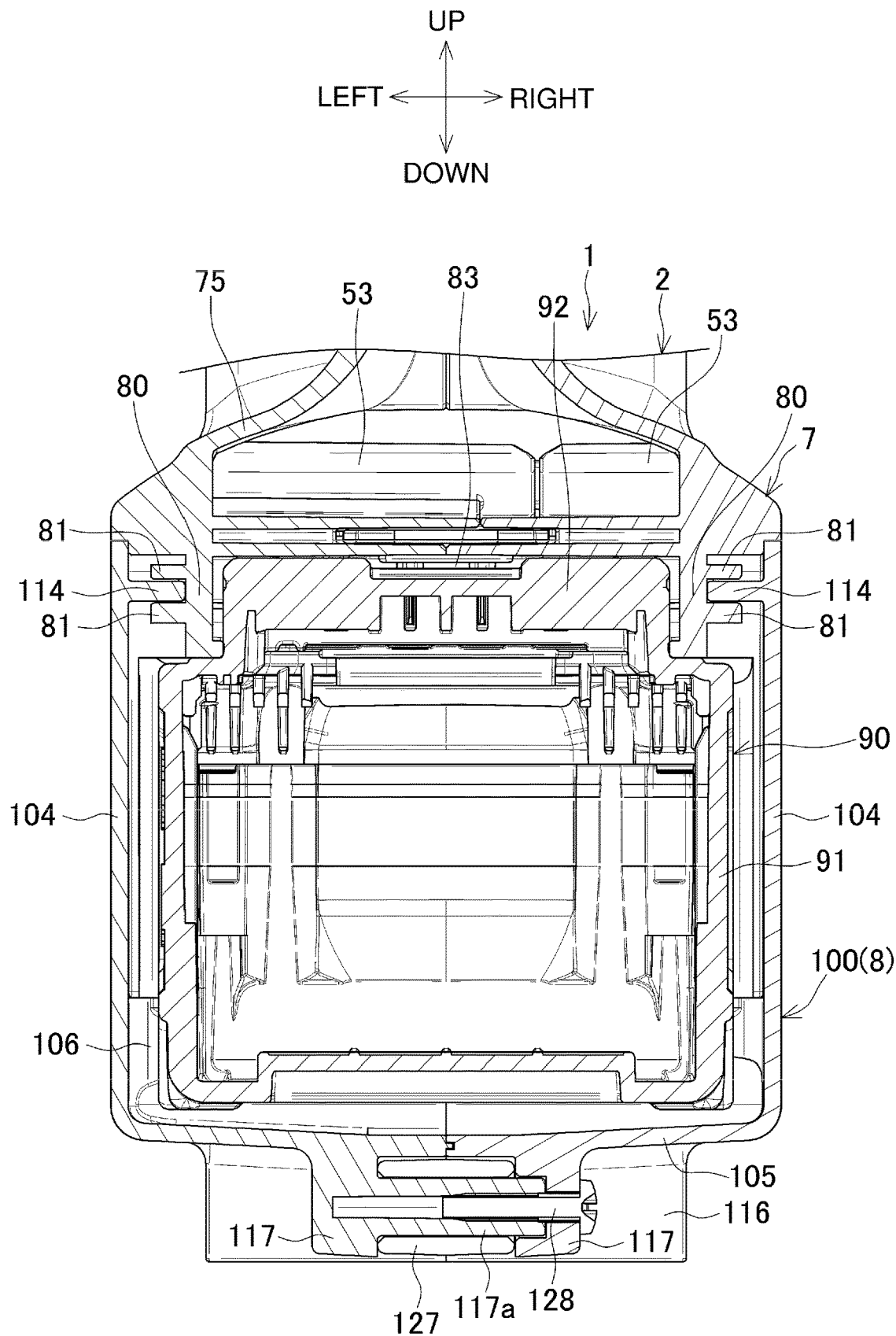
FIG. 7 is a cross-sectional view taken along line B-B in FIG. 3.

The rear lower plate 123 is connected continuously to the rear of the lower plate 105 of the body cover 100. The rear lower plate 123 has a joint 127 at the lateral center of its front end lower surface. The joint 127 is located between the support projections 117. As shown in FIG. 7, the screw boss 117a in the left support projection 117 extends through the joint 127. The support projections 117 are connected with each other with a screw 128 screwed from the right. The support projections 117 and the joint 127 are thus rotatably connected with each other about the screw 128. The rear lower plate 123 receives a rear leg 129 raised downward from its lower surface behind the joint 127. The rear leg 129 has the same lateral width and vertical length as the front leg 116. The front leg 116 and the rear leg 129 protrude more downward from the support projections 117 and the joint 127. The concrete vibrator 1 can thus be placed directly on a flat floor or other placement surfaces with the battery cover 8 located downward.

The openable cover 101 is rotatably connected to the body cover 100 about the screw 128 as an axis. In other words, the openable cover 101 is rotatable between a closed position in FIGS. 2 and 3 at which an opening 100c in the rear end of the body cover 100 is closed and an open position in FIGS. 4 and 5 at which the opening 100c is open.

The openable cover 101 includes a pair of right and left ribs 130 on its inner surface. The pair of ribs 130 extend from the rear plate 120 to the rear lower plate 123. Each rib 130 is adjacent to or in contact with the rear surface and lower surface of the battery pack 90 attached to the battery holder 7.

The battery cover 8 is attached to the battery holder 7 in a manner slidable from the rear. Before the battery pack 90 is attached, the battery cover 8 is placed to have the front plate 106 in the body cover 100 facing frontward, and the right and left slide rails 114 are fitted between the outer guide rails 81 on the right and left guide plates 80. As shown in FIG. 1, when the battery cover 8 is slid forward, the right and left side plates 104 come in contact with the side walls 78 in the battery holder 7. As shown in FIG. 3, the front plate 106 at this position has its engaging tab 115 engaged with the engaging groove 79 on the front wall 76. At the same time, the upper plate 103 has its body engaging tab 112 on the hook plate 109 engaged with the body cover recess 77 on the battery holder 7. In this manner, the battery cover 8 is attached to the battery holder 7.

To detach the battery cover 8, the openable cover 101 at the closed position is opened first. In this state, in response to the operation recess 126 on the rear upper plate 121 being pressed downward, the cover engaging tab 124 is disengaged downward from the openable cover recess 107. As the rear upper plate 121 is pressed rearward and then rotated downward, the openable cover 101 is rotated to the open position.

The operation tab 113 on the hook plate 109 protruding into the opening 100c in the body cover 100 is then pressed downward. The body engaging tab 112 is thus disengaged downward from the body cover recess 77 to release the body cover 100 that has been prevented from being slipping off. With the body cover 100 further sliding rearward, the battery cover 8 can thus be detached from the battery holder 7.

Figure 11:
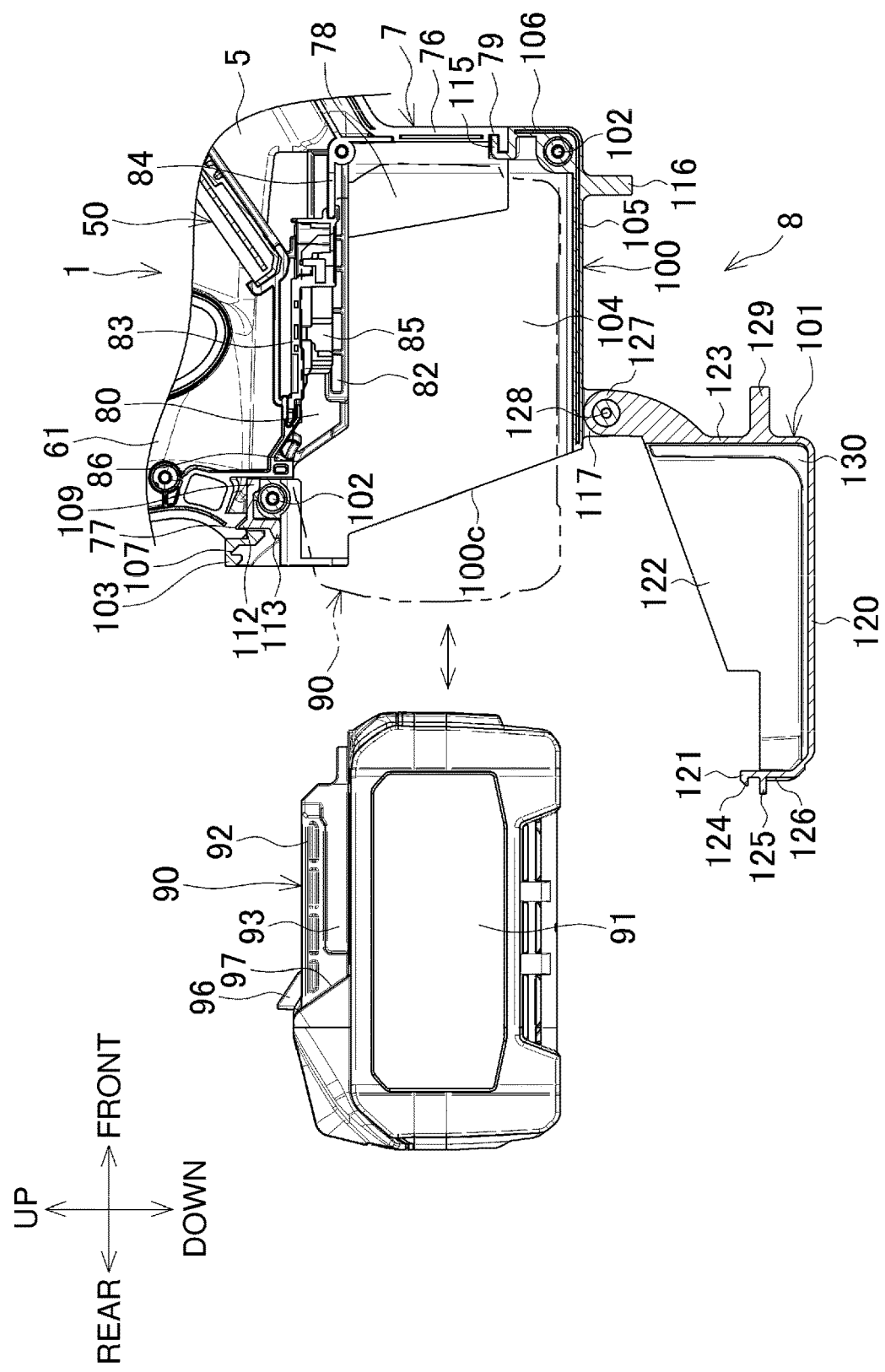
FIG. 11 is a diagram describing the battery pack being attached to or detached from the battery holder in the first embodiment.

To attach the battery pack 90, the openable cover 101 is at the open position. As indicated by a two-dot chain line in FIG. 11, the battery pack 90 is placed through the opening 100c in the body cover 100 to be attached to the battery holder 7 in a slidable manner. As shown in FIGS. 2 and 3, when the battery pack 90 is attached and then the openable cover 101 is rotated to the closed position, the battery pack 90 is covered entirely with the battery cover 8.

To detach the battery pack 90, the openable cover 101 alone is rotated to the open position. This exposes the rear portion of the battery pack 90. When the hook button 95 is pressed to disengage the hook 96 from the battery recess 86, the battery pack 90 can be slid rearward to be detached.

This allows the battery pack 90 to be attachable and detachable without the battery cover 8 being detached from the battery holder 7. The opening 100c in the body cover 100 is located on a path along which the battery pack 90 is attached or detached. With the openable cover 101 at the open position, the battery pack 90 can thus be detachable without being in contact with the battery cover 8.

For casting concrete, the concrete vibrator 1 receiving the vibrating rod 14 is inserted into concrete in a cast. In this state, the upper trigger 68 or the lower trigger 69 in the switch lever 67 is pressed. The switch 65 is then turned on to supply power from the battery pack 90 to the motor 10 through the controller 50. This rotates the rotor 16. In other words, the microcomputer in the control circuit board 52 determines the rotational position of the rotor 16 based on a detection signal transmitted from the sensor circuit board 23. The switching elements then perform switching to sequentially apply a three-phase current to each coil 20. This rotates the rotor 16. The rotational shaft 25 is thus rotated to rotate the flexible shaft 47 in the vibrating rod 14 through the spindle 40 integral with the rotational shaft 25. This rotates the unbalanced weight to generate vibration, causing concrete to flow around in the entire cast.

As the fan 32 rotates together with the rotational shaft 25, air is drawn through the inlets 55 in the controller compartment 5 as indicated by dotted arrows in FIG. 2. The air flows along the U-shaped intake air flowing path 58 toward the controller 50. The air is thus in contact with the heat-dissipating member 54 in the case 51 to increase heat-dissipation from the controller 50. The air then passes through the motor 10 between the support ribs 17 to cool the motor 10. After cooling the motor 10, the air flows radially outward from the fan 32, passes through the outlet channel 35, and is then discharged outward through the outlets 36.

The battery holder 7 receives the battery cover 8 in a detachable manner. As shown in FIGS. 4 and 5, when the battery cover 8 is, for example, damaged, the damaged battery cover 8 can thus be detached for repair or replacement.

The battery holder 7 can also receive a battery pack larger than the battery pack 90. The battery holder 7 thus also receives a larger battery cover designed for a larger battery pack in a detachable manner, in place of the battery cover 8.

Figure 12:
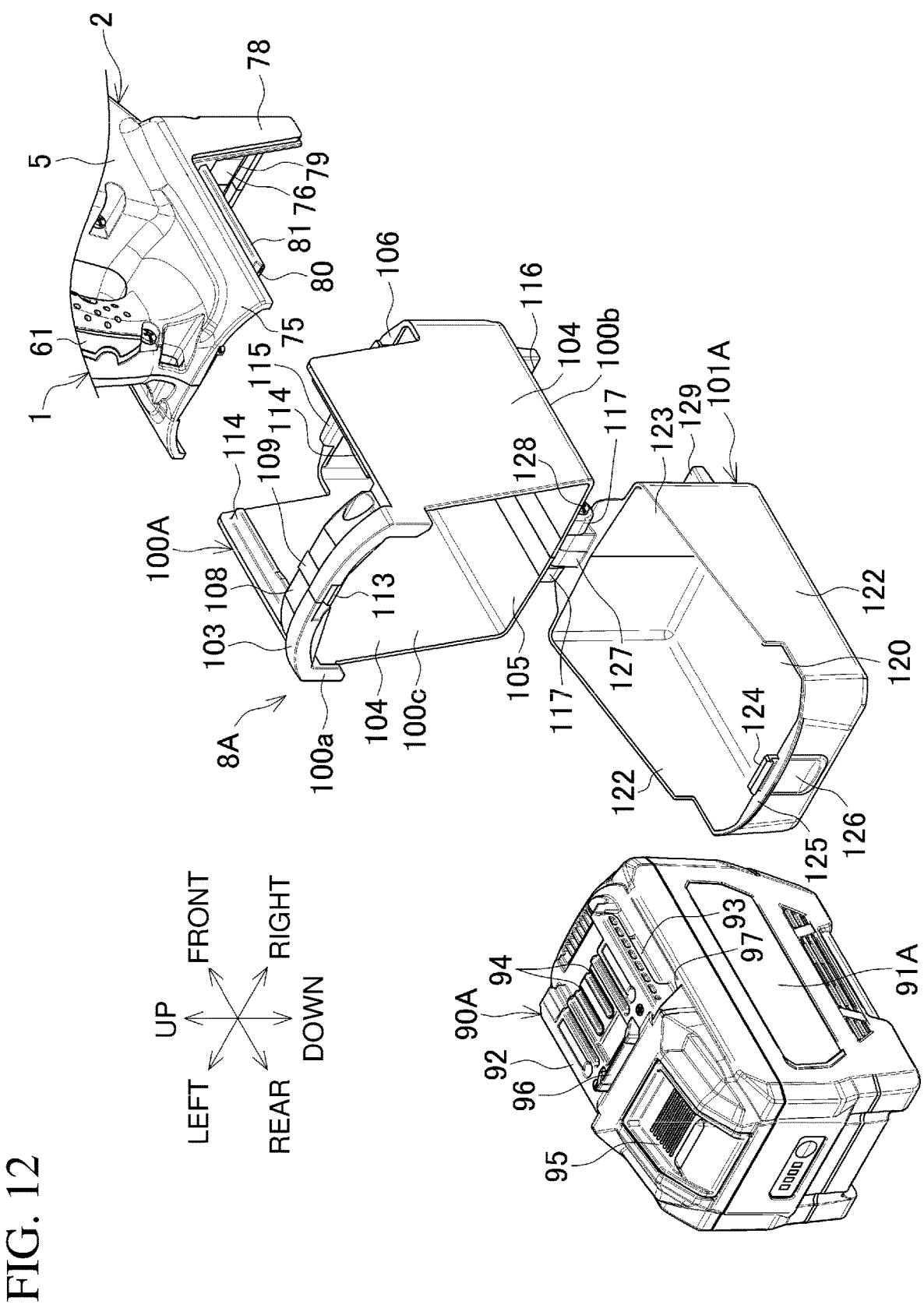
FIG. 12 is a perspective view of the battery holder, a larger battery cover, and a larger battery pack in the first embodiment as viewed from the rear.

FIG. 12 shows a larger battery cover (second battery cover) 8A and a larger battery pack 90A. The battery cover 8A includes a body cover (second body cover) 100A and an openable cover (second openable cover) 101A. The body cover 100A has a larger vertical dimension than the body cover 100 in the battery cover 8 (first battery cover). The openable cover 101A has larger vertical and front-rear dimensions than the openable cover 101 (first openable cover). The battery cover 8A has the same structure as the battery cover 8 except the dimensions described above. The battery cover 8A may have a larger lateral dimension than the battery cover 8.

The battery pack 90A (second battery pack) includes a body case 91A having a larger vertical dimension than the battery pack 90 (first battery pack). The battery pack 90A has the same structure as the battery pack 90 except the dimension described above.

Similarly to the battery cover 8 and the battery pack 90, the battery holder 7 receives the battery cover 8A and the battery pack 90A in a detachable manner.

Figure 13:
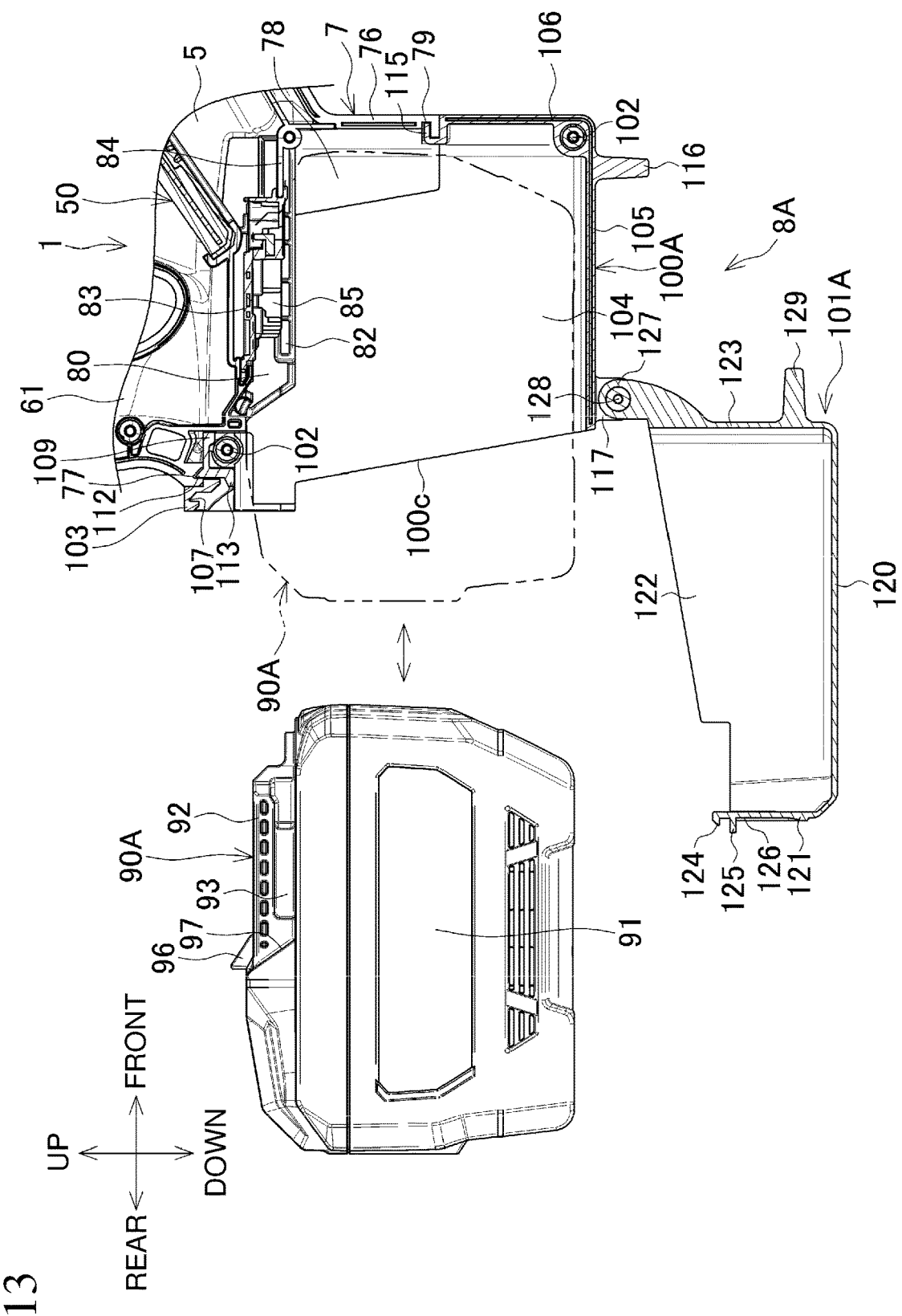
FIG. 13 is a diagram describing the larger battery pack being attached to or detached from the battery holder in the first embodiment.
Figure 14:
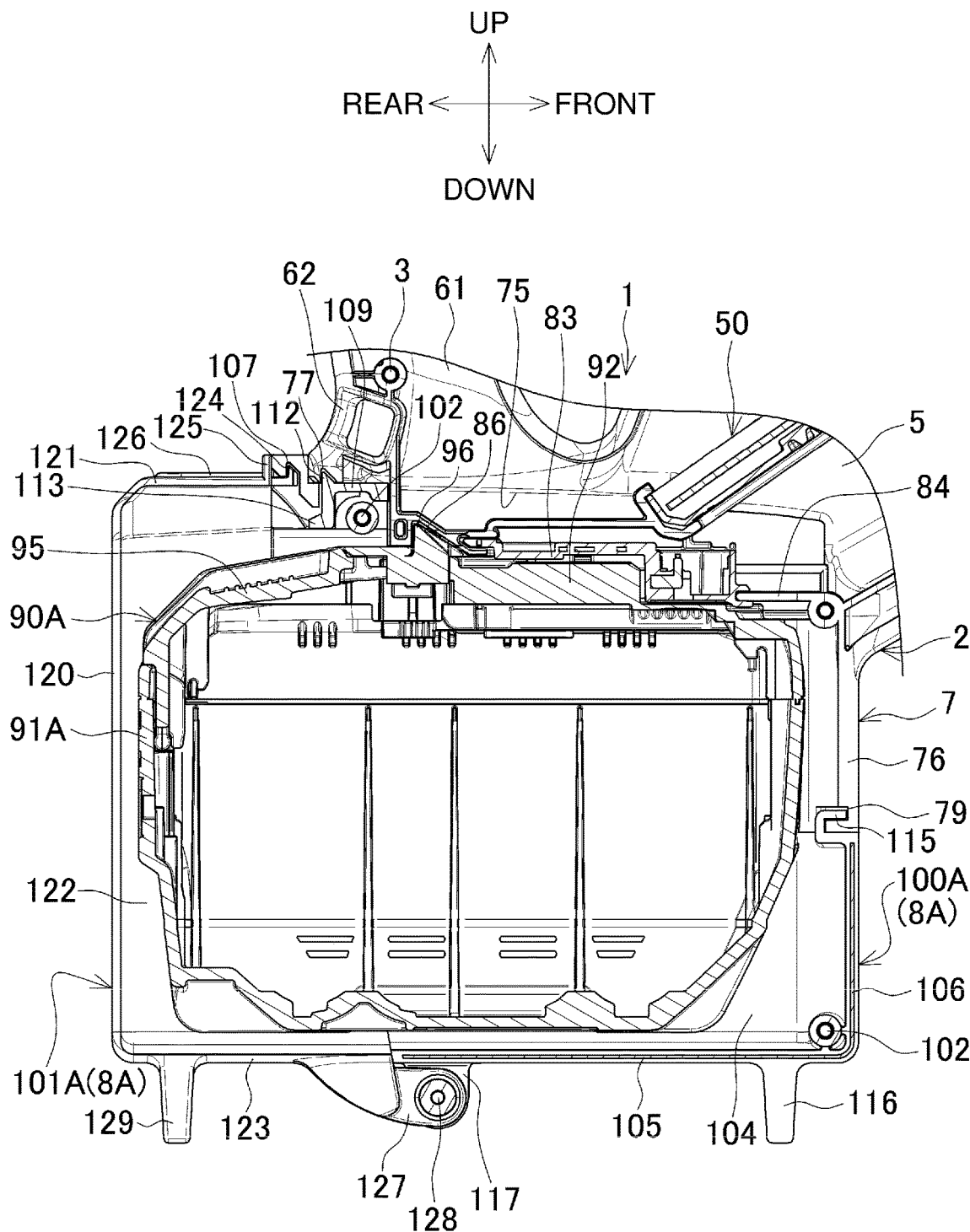
FIG. 14 is an enlarged view of the battery holder in the first embodiment with the larger battery pack being attached, corresponding to FIG. 3.

To use the second battery pack 90A, the first battery cover 8 is detached from the battery holder 7. The second body cover 100A in the second battery cover 8A is then attached to the battery holder 7. As shown in FIG. 13, with the second openable cover 101A at the open position, the second battery pack 90A is thus attachable and detachable by following the same procedure as for the first battery pack 90. As shown in FIG. 14, when the second battery pack 90A is attached and then the second openable cover 101A is rotated to the closed position, the second battery pack 90A is covered entirely with the second battery cover 8A.

A user can perform work simply after buying a set of the concrete vibrator 1, the first battery cover 8, and the first battery pack 90. When the first battery cover 8 is, for example, damaged, the user can repair the first battery cover 8 or may buy a new first battery cover 8.

When the user intends to work for a longer time than the time available by using the first battery pack 90, the user may additionally buy the larger second battery cover 8A and the larger second battery pack 90A. This allows the user to selectively use either the battery with the same concrete vibrator 1.

The concrete vibrator 1 according to the present embodiment includes the motor 10 and the motor compartment 4 (motor housing) accommodating the motor 10. The concrete vibrator 1 also includes the battery holder 7 connected to the motor compartment 4 and receiving the battery pack 90 or 90A (battery) in a detachable manner, and the battery cover 8 or 8A to cover an overall part of the battery pack 90 or 90A held by the battery holder 7. The battery cover 8 or 8A is detachable from the battery holder 7.

This structure allows the use of the battery packs 90 and 90A with different sizes.

The battery cover 8 or 8A designed for the battery pack 90 or 90A can be used selectively. The concrete vibrator 1 thus entirely remains compact with the larger battery pack 90A used.

In addition, when the battery cover 8 or 8A is damaged, this structure allows easy replacement and other maintenance.

The battery holder 7 selectively receives the battery pack 90 (first battery) or the battery pack 90A (second battery) larger than the battery pack 90 in a detachable manner. The battery holder 7 receives the battery cover 8 (first battery cover) to cover the first battery pack 90 or the battery cover 8A (second battery cover) to cover the second battery pack 90A in a detachable manner.

This allows the selective use of the battery cover 8 or 8A in accordance with the use of the battery pack 90 or the battery pack 90A.

The battery pack 90 or 90A is attachable to and detachable from the battery holder 7 in a manner slidable in the front-rear direction (a predetermined linear direction). When the battery cover 8 or 8A is used, the battery pack 90 or 90A can thus be easily attachable and detachable.

The battery cover 8 or 8A is attachable to and detachable from the battery holder 7 in a manner slidable in the same linear direction as the battery pack 90 or 90A. The battery cover 8 or 8A can thus be attachable and detachable without being in contact with the battery packs 90 or 90A.

The battery holder 7 includes the outer guide rails 81 extending in the linear direction. The battery covers 8 and 8A each have the slide rails 114 extending in the linear direction and engageable with the outer guide rails 81. This allows the battery cover 8 or 8A to be attachable and detachable smoothly.

The battery covers 8 and 8A each have the hook plate 109 (engaging portion). The battery holder 7 has the body cover recess 77 (receiving portion) to be engaged with the hook plate 109 with the battery cover 8 or 8A attached. The battery cover 8 or 8A is thus prevented from slipping off with the battery cover 8 or 8A being attached.

The engaging portion is the hook plate 109 (hook), which allows easy engagement and disengagement.

The battery cover 8 or 8A attached to the battery holder 7 includes the opening 100c allowing the battery pack 90 or 90A to be attachable and detachable and the openable cover 101 or 101A (cover) to open or close the opening 100c. With the battery cover 8 or 8A being attached, the battery packs 90 or 90A can thus be attachable and detachable.

The opening 100c is located on a path along which the battery pack 90 or 90A is attached or detached. The battery pack 90 or 90A can thus be attachable and detachable simply by opening the openable cover 101 or 101A.

Modifications will now be described.

The battery and the battery cover may have other sizes rather than the two sizes. Three or more batteries and battery covers with different sizes may be used selectively.

In the present embodiment, the battery cover has the engaging portion, and the battery holder has the receiving portion. In some embodiments, the battery holder may have a hook or other engaging portions, and the battery cover may have a recess or other receiving portions.

In the present embodiment, the cover is rotatable about the axis along the lower end. In some embodiments, an openable cover may be rotatable about an axis along an upper end, or a right or left end. In some embodiments, a fitting portion including a protrusion and a recess may serve as an axis rather than the screw.

In some embodiments, a cover may be open or closed in a manner slidable rather than in a manner rotatable. In some embodiments, a battery cover may eliminate a cover (may include no openable part).

In some embodiments, another structure may be used, rather than the structure in which the battery holder receives the battery in a manner slidable from the rear. A battery may be received by the battery holder in a manner slidable from the front, or right or left. A battery may be received in a manner placeable from the bottom.

Similarly to this, a battery cover may be attached in a manner slidable from the front, right or left, or bottom. In some embodiments, other attachment structures (e.g., an attachment using an engagement between an engaging portion and a receiving portion) may be used rather than the sliding structure.

In some embodiments, a battery holder may be located differently, rather than being located in the lower portion of the housing. A battery holder may be located in a rear portion, upper portion, or one of side portions of the housing.

The electric work machine is not limited to a concrete vibrator. The electric work machine includes any rechargeable work machines such as a mixer, a vacuum pump, a working lamp, and a cleaner. In addition, the present disclosure is applicable to any power tool such as a caulking gun, a tacker, and a driver drill, or to any gardening tool such as a garden clipper and a grass cutter.

Second Embodiment

Figure 15:
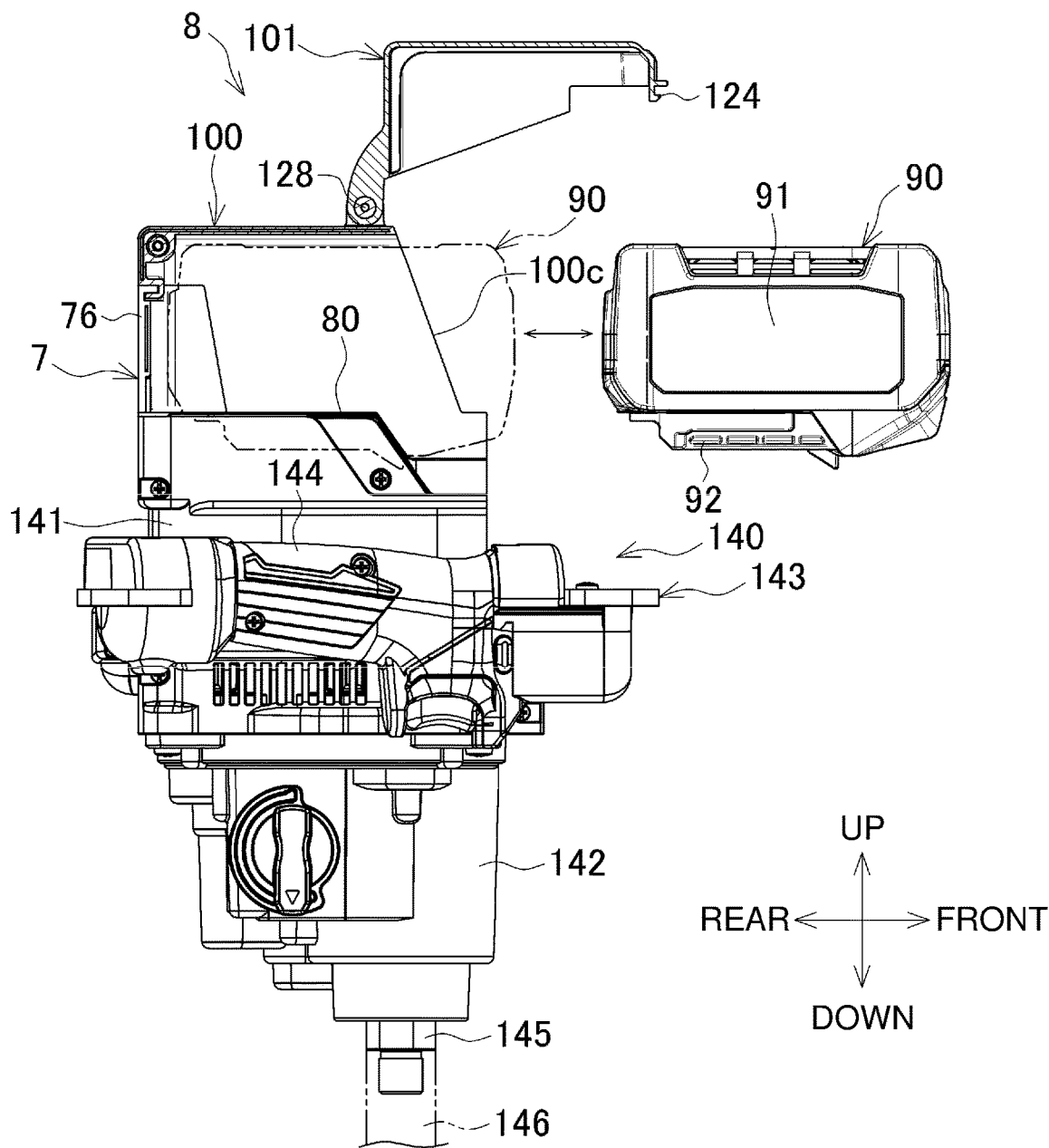
FIG. 15 is a diagram describing a battery pack being attached to or detached from a battery holder in a mixer according to a second embodiment.

FIG. 15 is a diagram of a mixer for mixing paint or other materials according to a second embodiment of the present disclosure. A mixer 140 includes an upper motor housing 141 and a lower reducer housing 142. The motor housing 141 accommodates a motor (not shown) and a controller (not shown). A handle 143 having a pair of right and left grips 144 is attached to the motor housing 141. The reducer housing 142 accommodates a reducer (not shown). The reducer includes a spindle 145 serving as an output shaft. The spindle 145 protrudes downward from the reducer housing 142. A stirring shaft 146 is coaxially connectable with the spindle 145. The stirring shaft 146 receives a blade (not shown) attached to its lower end.

The mixer 140 includes the battery holder 7. The battery holder 7 facing upward is located above the motor housing 141. The battery holder 7 can receive the battery pack 90 in a manner slidable from the front with the connector 92 facing downward. With the body cover 100 being vertically reversed relative to the positioning in the first embodiment, the body cover 100 in the battery cover 8 is attached to the battery holder 7 in a manner slidable from the front in a detachable manner. When the openable cover 101 is rotated upward to the open position with the body cover 100 being attached, the battery pack 90 is thus attachable and detachable through the opening 100c. With the openable cover 101 at the closed position, the battery pack 90 is covered entirely by the battery cover 8.

Figure 16:
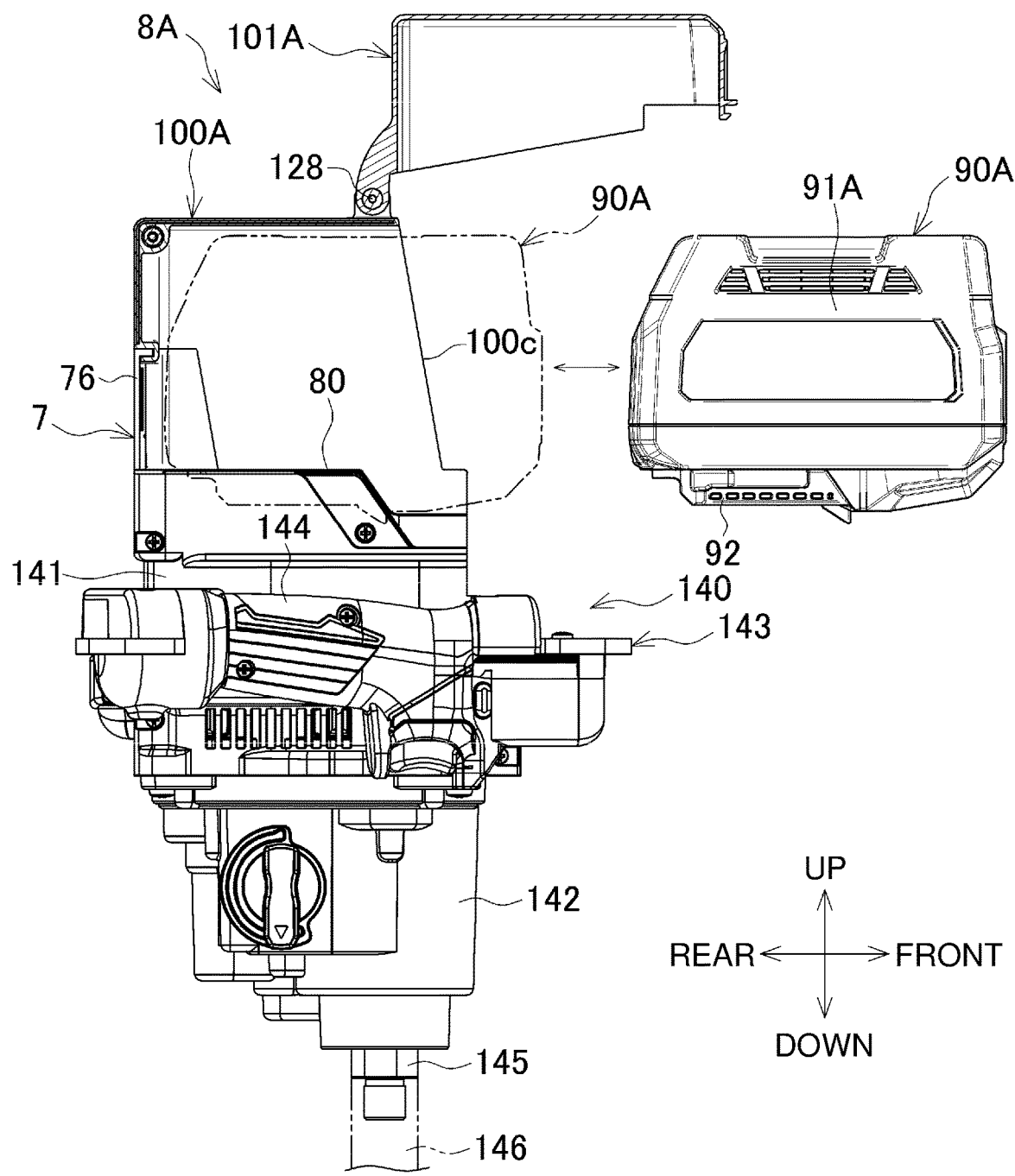
FIG. 16 is a diagram describing a larger battery pack being attached to or detached from the battery holder in the mixer according to the second embodiment.

To use the larger battery pack 90A (second battery pack), the battery cover 8 (first battery cover) is detached from the battery holder 7. The body cover 100A (second body cover) in the battery cover 8A (second battery cover) is vertically reversed and attached to the battery holder 7 in a manner slidable from the front. As shown in FIG. 16, with the openable cover 101A (second openable cover) at the open position, the battery pack 90A is thus attachable and detachable through the opening 100c. When the second battery pack 90A is attached and then the openable cover 101A is at the closed position, the battery pack 90A is covered entirely by the battery cover 8A.

In this mixer, the battery cover and the battery pack may be attached in a manner slidable from the rear, right or left, or above. Three or more battery covers and battery packs with different sizes may also be used.

In the first and second embodiments above, the battery cover 8 or 8A is attached to the body housing 2, and then the battery pack 90 or 90A is attached to the battery holder 7. This is because the body cover 100 or 100A in the battery cover 8 or 8A includes the front plate 106, which interferes with the battery pack 90 or 90A in a direction in which the battery cover 8 or 8A is detached. In other words, the battery pack 90 or 90A prevents the battery cover 8 or 8A from slipping off.

The body cover 100 or 100A with the front plate 106 allows the battery holder 7 to have the shorter front wall 76, downsizing the battery holder 7 and the body housing 2. To close the front opening in the body cover 100 or 100A without using the front plate 106, the body cover 100 or 100A may have its front portion entirely open, and the battery holder 7 may have its front wall 76 extended. In this structure, however, the front wall 76 extends longer upsizing the battery holder 7 and the body housing 2.

Third Embodiment

Figure 17:
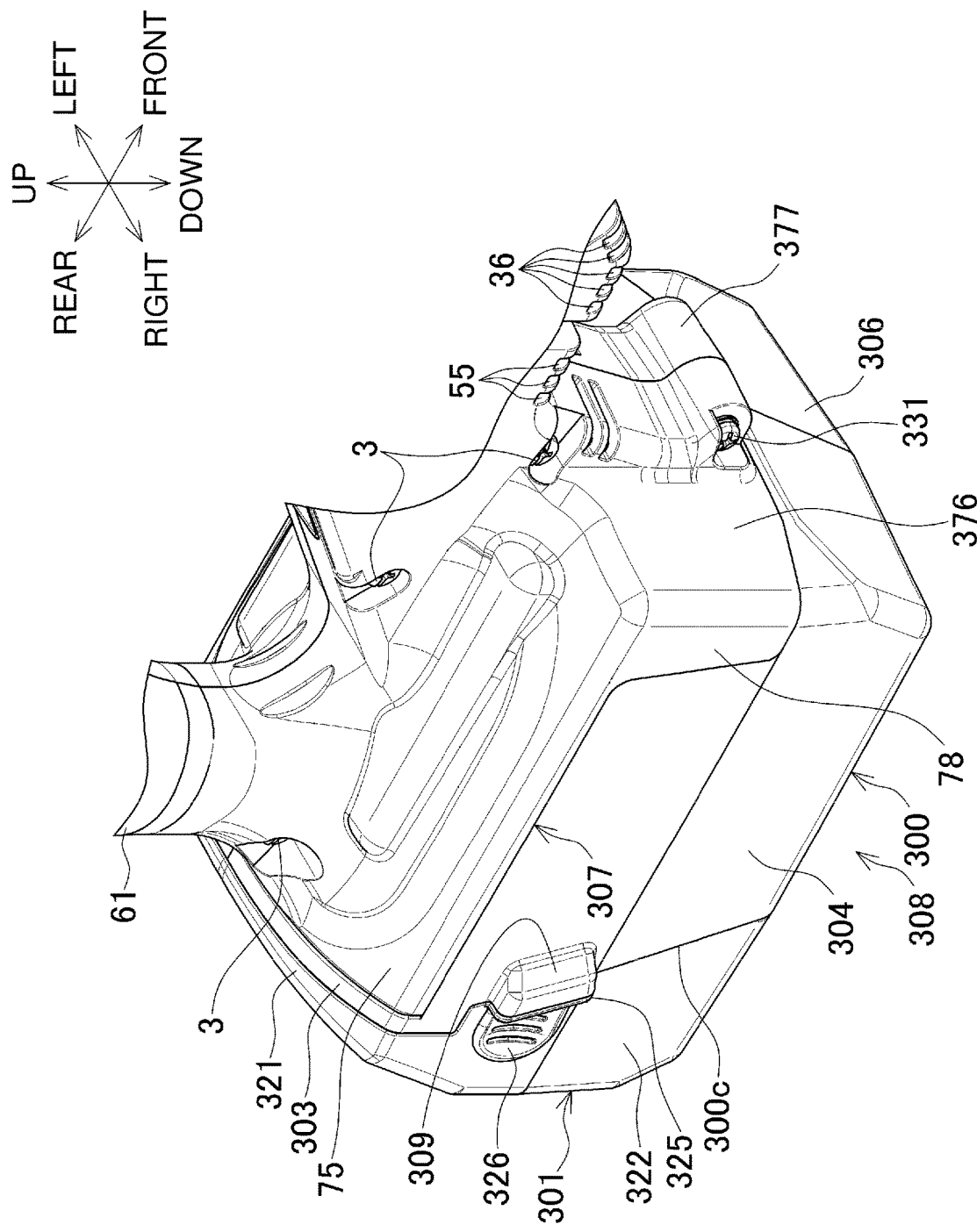
FIG. 17 is an enlarged perspective view of an example of a battery cover fastened by screwing to a battery holder in a concrete vibrator according to a third embodiment.
Figure 18:
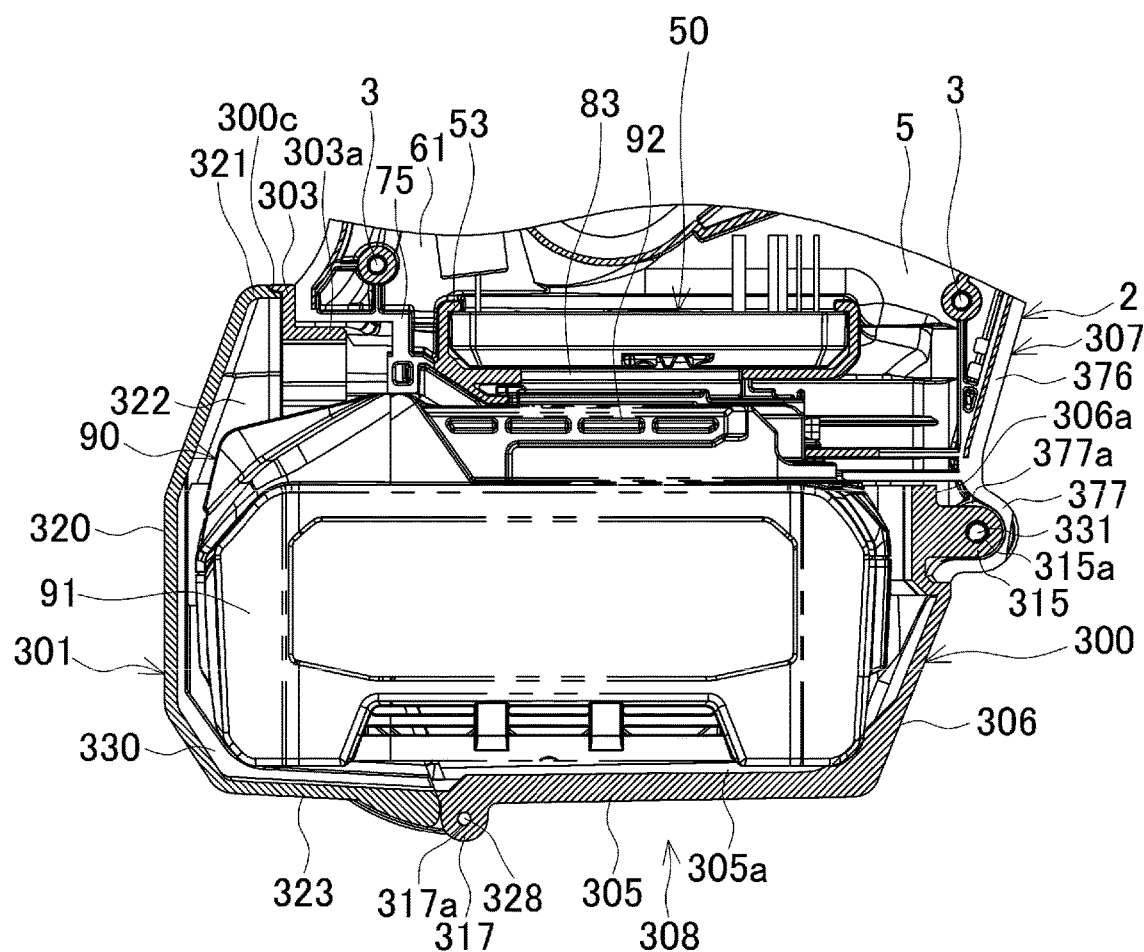
FIG. 18 is a longitudinal central sectional view of FIG. 17.
Figure 19:
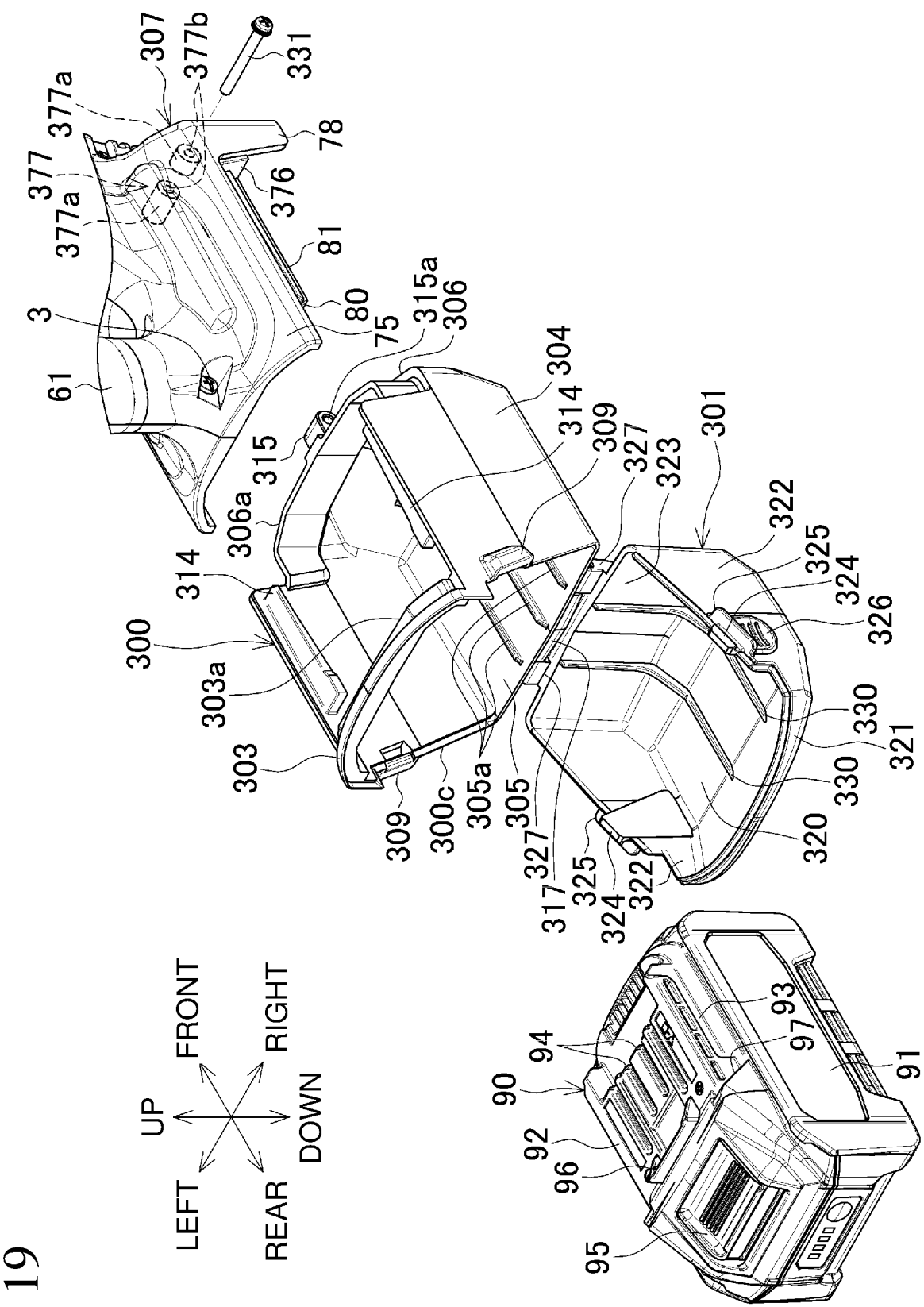
FIG. 19 is a perspective view of the battery holder, the battery cover, and a battery pack in the third embodiment as viewed from the rear.
Figure 20:
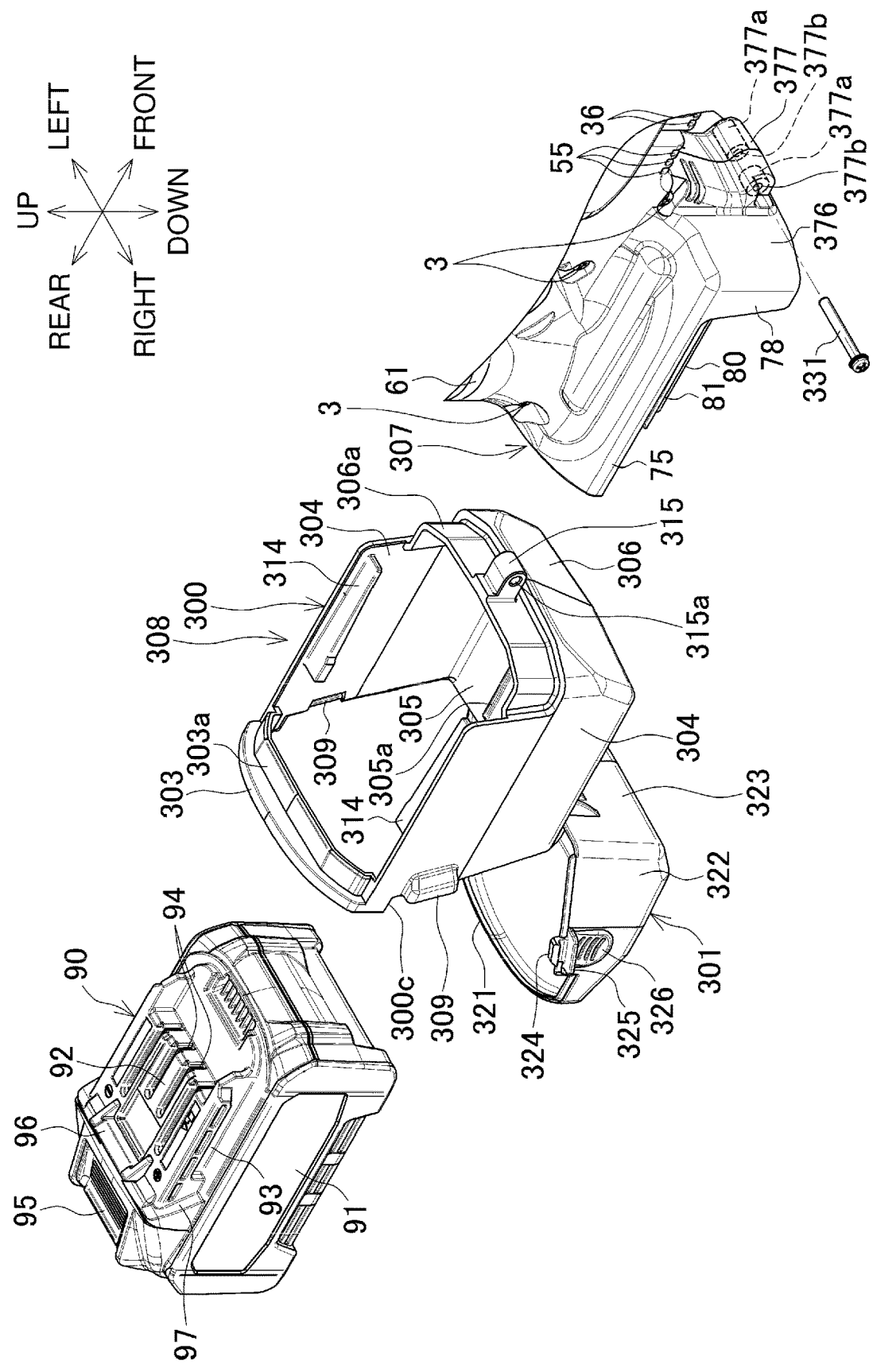
FIG. 20 is a perspective view of the battery holder, the battery cover, and the battery pack in the third embodiment as viewed from the front.
Figure 21:
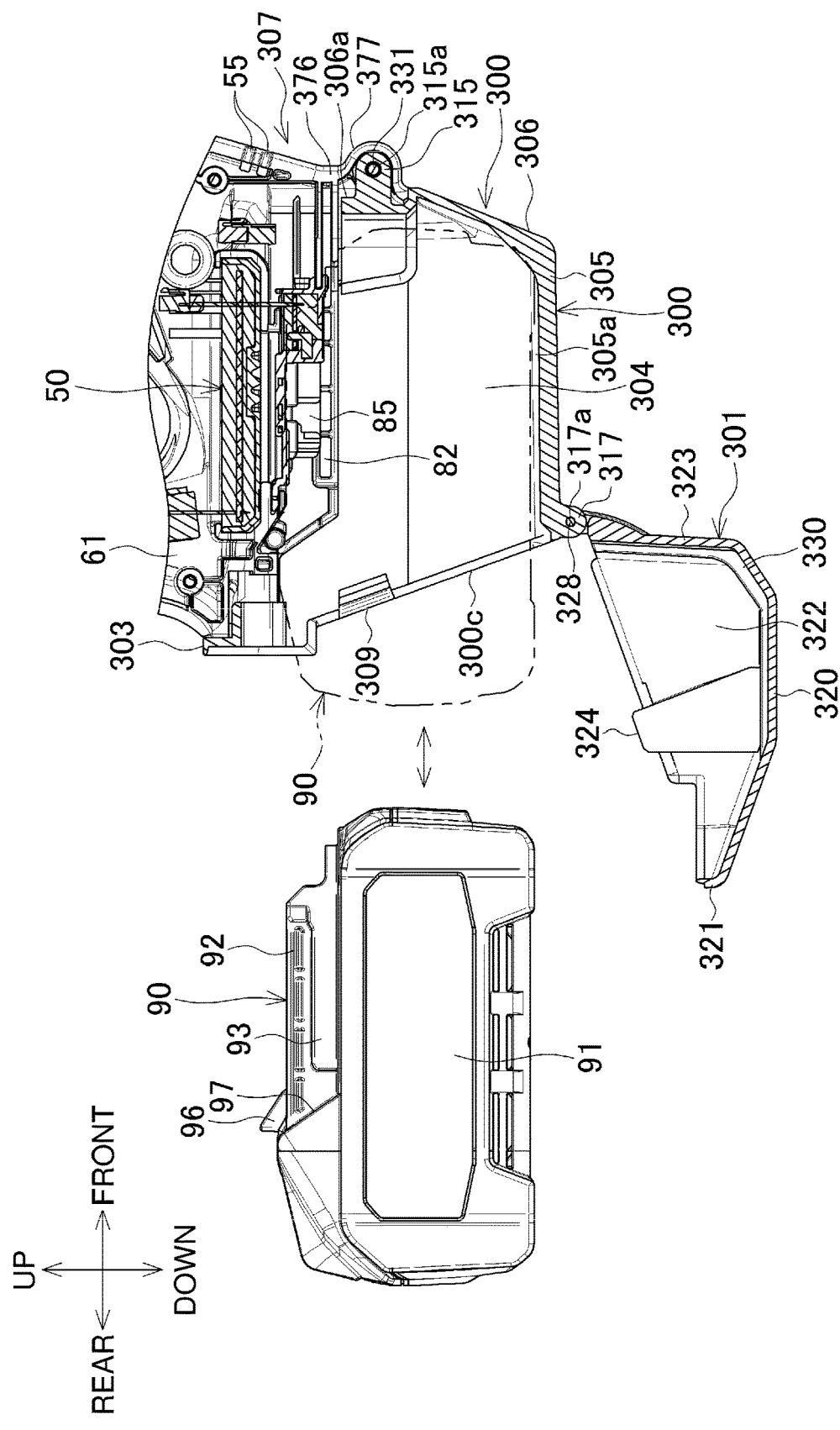
FIG. 21 is a diagram describing the battery pack being attached to or detached from the battery holder in the third embodiment.

FIG. 17 is an enlarged perspective view of an example of a battery cover fastened by screwing to a battery holder in a concrete vibrator according to a third embodiment. FIG. 18 is a longitudinal central sectional view of FIG. 17. FIG. 19 is a perspective view of the battery holder, the battery cover, and a battery pack as viewed from the rear. FIG. 20 is a perspective view of the battery holder, the battery cover, and the battery pack as viewed from the front. FIG. 21 is a diagram describing the battery pack being attached to or detached from the battery holder in the third embodiment.

The third embodiment is the same as the first embodiment except the battery holder and the battery cover. The same components and portions as in the first embodiment are given the same reference numerals and will not be described repeatedly.

A battery holder 307 in the third embodiment includes an upper wall 75, a front wall 376, side walls 78, guide plates 80, outer guide rails 81, and inner guide rails 82. The battery holder 307 does not have the body cover recess 77 and the engaging groove 79.

The front wall 376 is the same as the front wall 76 in the first embodiment except having a screw boss receiver 377. The screw boss receiver 377 protrudes frontward from other portions in the front wall 376. Battery holder bosses 377*a* are located on the respective right and left of the screw boss receiver 377. Each battery holder boss 377*a* has a screw hole 377*b* extending laterally. In some embodiments, the screw boss receiver 377 does not protrude frontward.

The battery holder 307 includes a terminal mount 83 and a battery recess 86.

In the same manner as in the first embodiment, the battery holder 307 receives the battery pack 90 in a detachable manner.

A battery cover 308 in the third embodiment includes a front body cover 300 and a rear openable cover 301. The openable cover 301 opens or closes the rear of the body cover 300. The body cover 300 includes an upper plate 303, right and left side plates 304, a lower plate 305, and a front plate 306 as one piece. The body cover 300 extends in the front-rear direction. The body cover 300 is a box with an upper portion open and a rear portion being an opening closable with a lid. The upper plate 303 has its rear portion connected continuously to the rear of the upper wall 75 in the battery holder 307. The upper plate 303 does not have the openable cover recess 107.

The upper plate 303 has an overlap 303*a* in its front portion. The overlap 303*a* is located lower than the rear portion of the upper plate 303, and overlaps the upper wall 75 from below. The overlap 303*a* does not include the hook plate 109.

The side plates 304 are connected continuously to the rear portions of the side walls 78 of the battery holder 307. The side plates 304 have a larger vertical dimension than the side walls 78. The side plates 304 each have a slide rail 314 extending in the front-rear direction on its upper inner surface. Each slide rail 314 is fittable between the outer guide rails 81 located on the corresponding guide plate 80 on the battery holder 307. The side plates 304 each have a cover receiving portion 309 on its rear end. Each cover receiving portion 309 protrudes laterally outward from its surrounding portion.

The front plate 306 is raised from the front end of the lower plate 305. The upper plate 306 has a front overlap 306*a* in its upper portion. The front overlap 306*a* is located more rearward from the lower portion of the front plate 306, and overlaps the front wall 376 from behind. The front plate 306 has its lower portion connected continuously to the lower portion of the front wall 376. The front overlap 306*a* has a screw boss 315 at its center. The screw boss 315 protrudes frontward from its surrounding portion. The screw boss 315 has a screw hole 315*a* extending laterally. The screw boss 315 is receivable between the battery holder bosses 377*a* in the screw boss receiver 377. When the screw boss 315 is received, the right screw hole 377*b*, the screw hole 315*a*, and the left screw hole 377*b* are aligned laterally. In the third embodiment, the front plate 306 does not include the engaging tab 115. In some embodiments, both the engaging tab 115 and the engaging groove 79 may be used. The battery holder 307 engaged with the battery cover 308 using these components may be used in addition to fastening with screws. Similarly to this, the body engaging tab 112 and the body cover recess 77 may be used. The battery holder 307 engaged with the battery cover 308 using these components may be used in addition to fastening with screws.

The lower plate 305 has a support projection 317 facing downward on its rear end. The support projection 317 extends laterally. The support projection 317 has a hole 317*a* extending laterally. The body cover 300 includes, on its inner surface, three ribs 305*a* arranged laterally. Each rib 305*a* is raised rearward from the lower rear surface of the front plate 306, and then upward from the upper surface of the lower plate 305. Each rib 305*a* extends in the front-rear direction. Each rib 305*a* is adjacent to or in contact with the front surface or the lower surface of the battery pack 90 attached to the battery holder 307. The lower plate 305 does not receive the front leg 116.

The openable cover 301 includes a rear plate 320, a rear upper plate 321, rear side plates 322, and a rear lower plate 323. The directions of the openable cover 301 are, unless otherwise specified, the directions used when the openable cover 301 is closed.

The rear upper plate 321 is connected continuously to the rear of the upper plate 303 in the body cover 300.

The rear side plates 322 each have the same vertical length as the side plate 304 in the body cover 300, and are connected continuously to the rear of the side plate 304. Each rear side plate 322 includes, on its front upper end, a cover engaging tab 324 facing frontward. Stoppers 325 are raised laterally outward behind the respective cover engaging tabs 324. The stoppers 325 extend vertically. Operation recesses 326 are located behind the respective stopper 325. In some embodiments, a cover engaging tab may be located in the body cover 300, and a cover receiving portion may be located in the openable cover 301.

The rear lower plate 323 is connected continuously to the rear of the lower plate 305 of the body cover 300. The rear lower plate 323 has joints 327 on its front end lower surface. The joints 327 are aligned laterally. Each joint 327 has a hole 327*a* extending laterally. The lower plate 305 in the body cover 300 has the support projection 317 between the joints 327. A shaft member 328 extends all through the hole 317*a* in the support projection 317 and the holes 327*a* in the joints 327. The support projection 317 and the joints 327 are thus rotatably connected with each other about the shaft member 328. The rear lower plate 323 does not receive the rear leg 129.

The openable cover 301 is rotatably connected to the body cover 300 about the shaft member 328 as an axis. In other words, the openable cover 301 is rotatable between a closed position in FIGS. 17 and 18 at which the opening 300*c* in the rear end of the body cover 300 is closed, and an open position in FIGS. 19 and 20 at which the opening 300*c* is open.

With the openable cover 301 being closed, each cover engaging tab 324 is engaged with the corresponding cover receiving portion 309 in the body cover 300. The openable cover 301 thus remains closed relative to the body cover 300. With the openable cover 301 being closed, the stoppers 325 are in contact with or adjacent to the cover receiving portions 309. The operation recesses 326 is pressed laterally inward with fingers to disengage the cover engaging tabs 324 from the cover receiving portions 309. The openable cover 301 is pressed rearward to be open relative to the body cover 300.

The openable cover 301 includes a pair of right and left ribs 330 raised from its inner surface and extending from the rear plate 320 to the rear lower plate 323. With the openable cover 301 being closed, the left rib 330 is connected continuously to the left rib 305a on the lower plate 305 in the body cover 300. With the openable cover 301 being closed, the right rib 330 is connected continuously to the right rib 305a on the lower plate 305 in the body cover 300. Each rib 330 is adjacent to or in contact with the rear surface and the lower surface of the battery pack 90 attached to the battery holder 307.

The battery cover 308 is slid from the rear of the battery holder 307, and then held by the battery holder 307 by fastening with a screw 331. Before the battery pack 90 is attached, the battery cover 308 is placed to have the front plate 306 in the body cover 300 facing frontward, and the right and left slide rails 314 are fitted between the outer guide rails 81 on the right and left guide plates 80. As shown in FIG. 17, when the battery cover 308 is slid forward, the right and left side plates 304 come in contact with the side walls 78 in the battery holder 307. As shown in FIG. 18, the front plate 306 at this position has the screw boss 315 received by the screw boss receiver 377 in the front wall 376. The screw 331 is screwed from the right of the right battery holder boss 377a all through the screw hole 315a in the screw boss 315 and the screw holes 377b in the battery holder bosses 377a in the screw boss receiver 377. The battery cover 308 is thus attached to the battery holder 307.

To detach the battery cover 308, the screw 331 is unscrewed, and then the body cover 300 is slid rearward.

To attach the battery pack 90, the openable cover 301 is at the open position. As indicated by a two-dot chain line in FIG. 21, the battery pack 90 is placed through the opening 300c in the body cover 300 to be attached to the battery holder 307 in a slidable manner. As shown in FIGS. 17 and 18, when the battery pack 90 is attached and then the openable cover 301 is rotated to the closed position, the battery pack 90 is covered entirely by the battery cover 308.

To detach the battery pack 90, the openable cover 301 alone is rotated to the open position. This exposes the rear portion of the battery pack 90. When a hook button 95 is pressed to disengage a hook 96 from a battery recess 86, the battery pack 90 can be slid rearward to be detached.

This allows the battery pack 90 to be attachable and detachable without the battery cover 308 being detached from the battery holder 307. The opening 300c in the body cover 300 is located on a path along which the battery pack 90 is attached or detached. With the openable cover 301 at the open position, the battery pack 90 can thus be attachable and detachable without being in contact with the battery cover 308.

In the same manner as in the first embodiment, the battery holder 307 in the third embodiment selectively receives one of two or more types of batteries and one of two or more types of battery covers in a detachable manner.

The battery holder 307 in the third embodiment also receives the battery pack 90 after receiving the battery cover 308. The battery pack 90 thus prevents the battery cover 308 from slipping off. The battery cover 308 in the third embodiment also has the front plate 306 in the body cover 300. This allows the battery holder 307 to have the shorter front wall 376, downsizing the battery holder 307 and the body housing 2.

In the concrete vibrator according to the third embodiment, the battery cover 308 is fastened to the battery holder 307 with the screw 331.

The battery cover 308 is thus easily attached to or detached from the battery holder 307 by screwing or unscrewing the screw 331 with a screwdriver. The battery cover 308 can be attached more firmly by fastening with the screw than by engaging a single engaging portion with a single receiving portion.

The concrete vibrator according to the third embodiment may be modified in the same manner as the modifications according to the first and second embodiments as appropriate.

The screw boss receiver 377 may have one battery holder boss or three or more battery holder bosses. Multiple screw bosses 315 may be used.

The screw bosses 315 may be located on the side walls 78 rather than or in addition to the front wall 376. The corresponding screw boss receivers 377 may be used.

Fourth Embodiment

Figure 22:
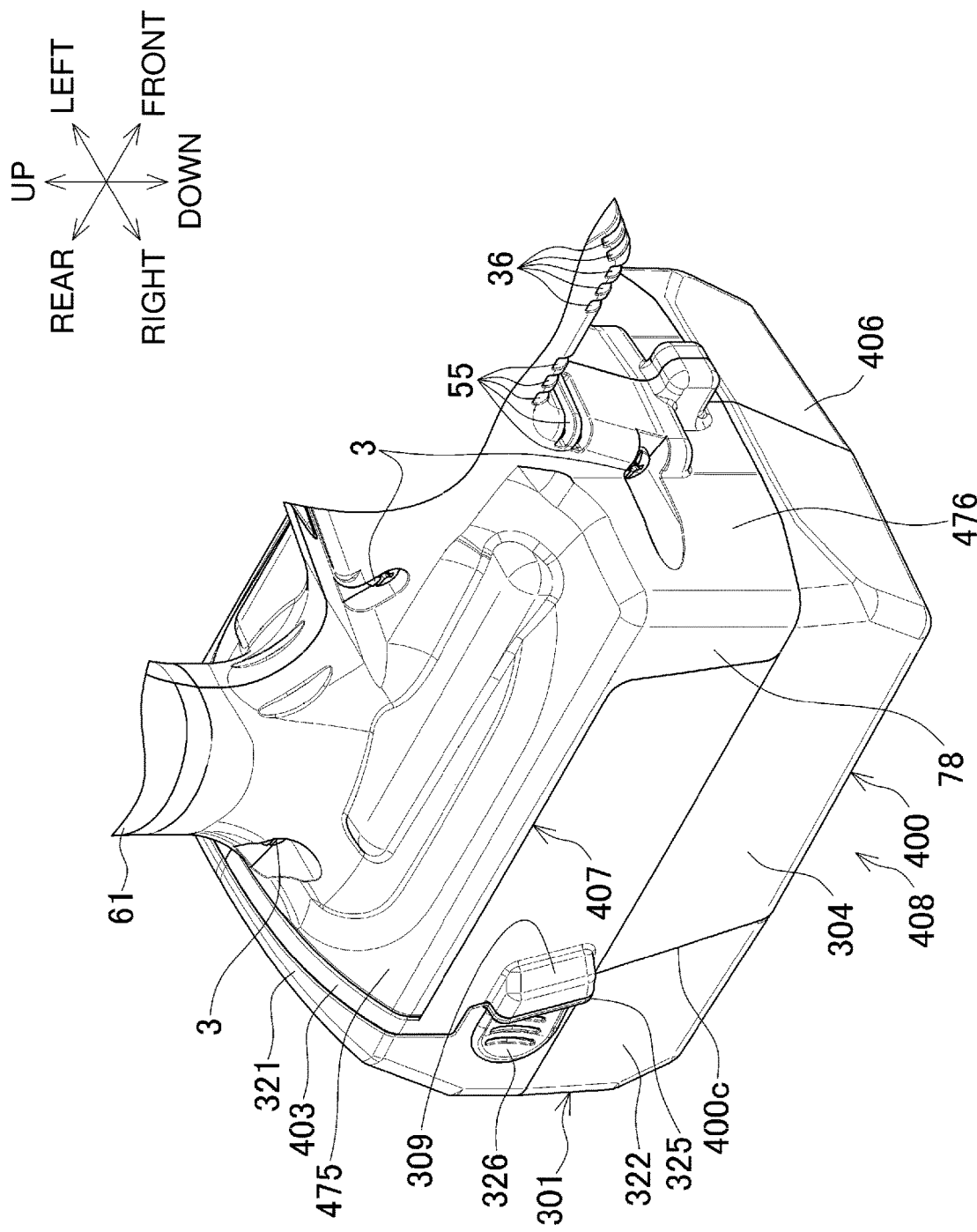
FIG. 22 is an enlarged perspective view of an example of a battery cover fastened by screwing to a battery holder in a concrete vibrator according to a fourth embodiment.
Figure 23:
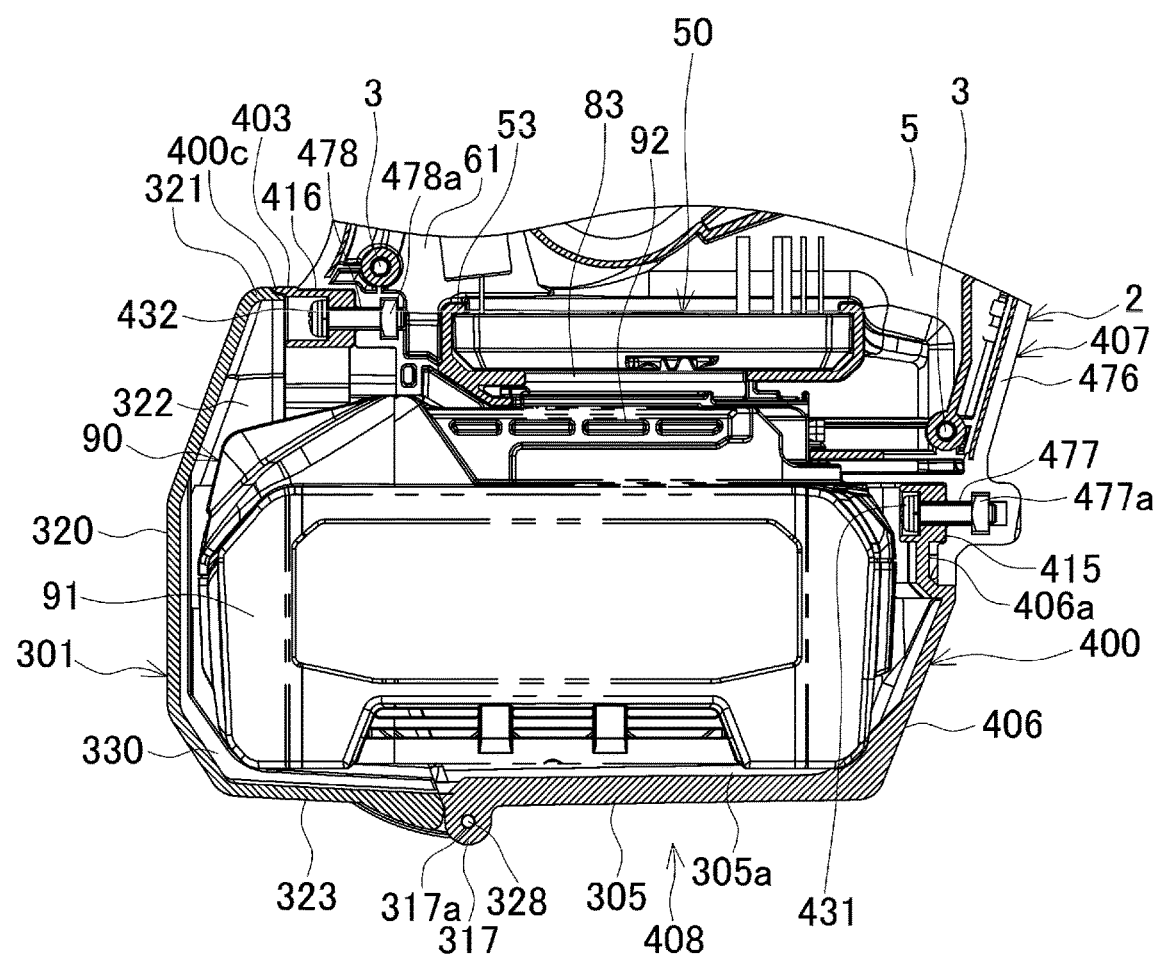
FIG. 23 is a longitudinal central sectional view of FIG. 22.
Figure 24:
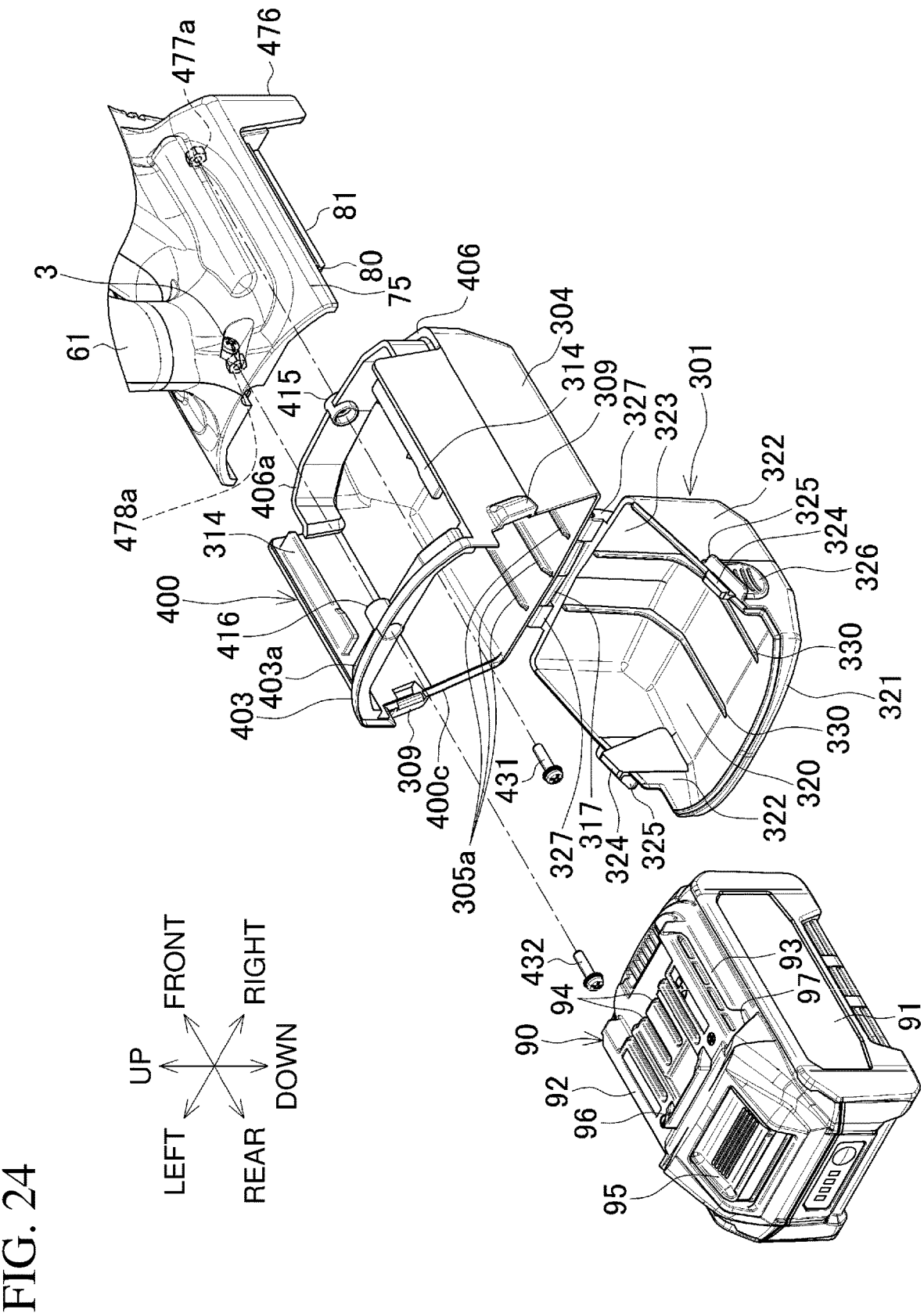
FIG. 24 is a perspective view of the battery holder, the battery cover, and a battery pack in the fourth embodiment as viewed from the rear.
Figure 25:
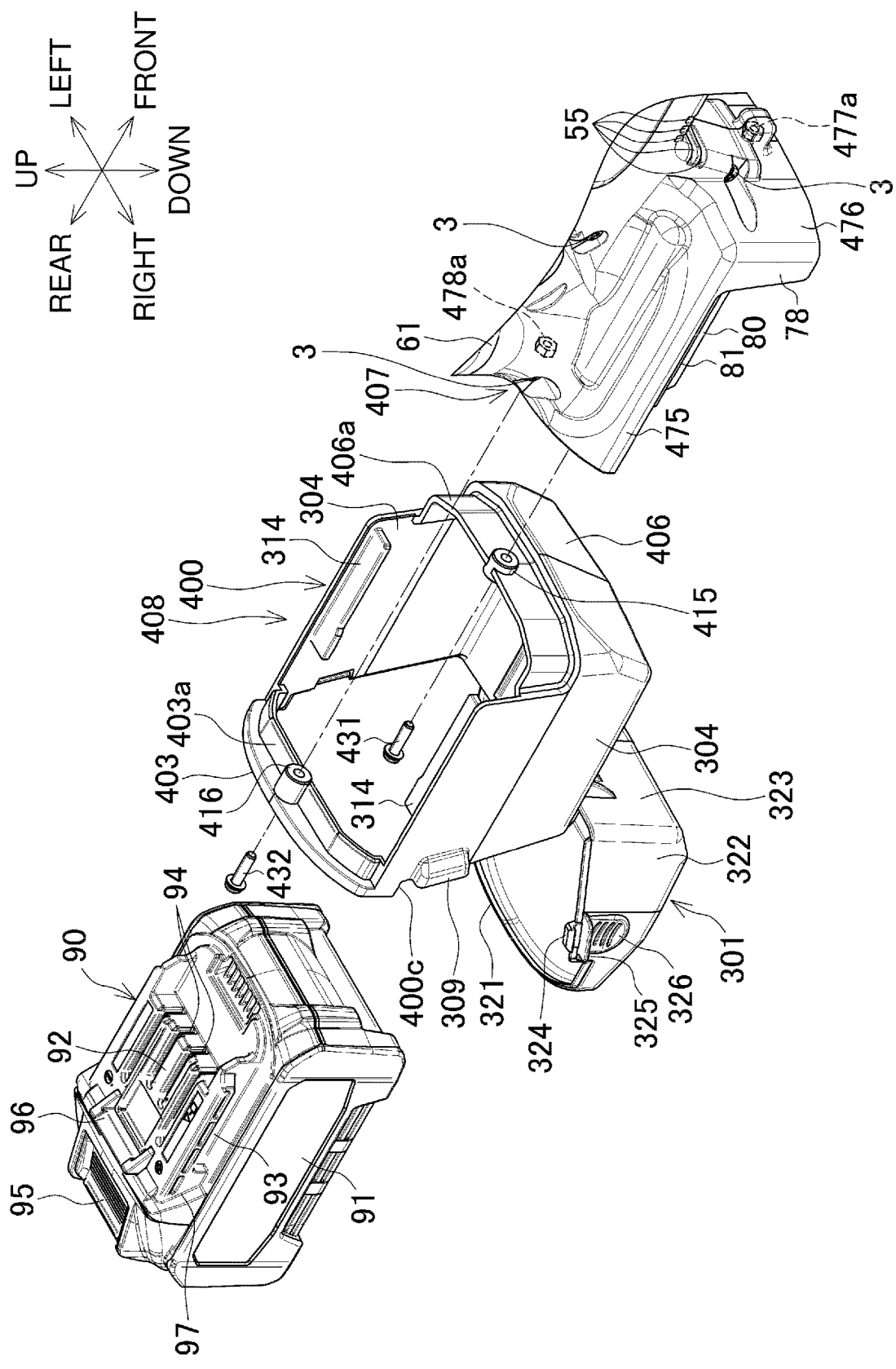
FIG. 25 is a perspective view of the battery holder, the battery cover, and the battery pack in the fourth embodiment as viewed from the front.
Figure 26:
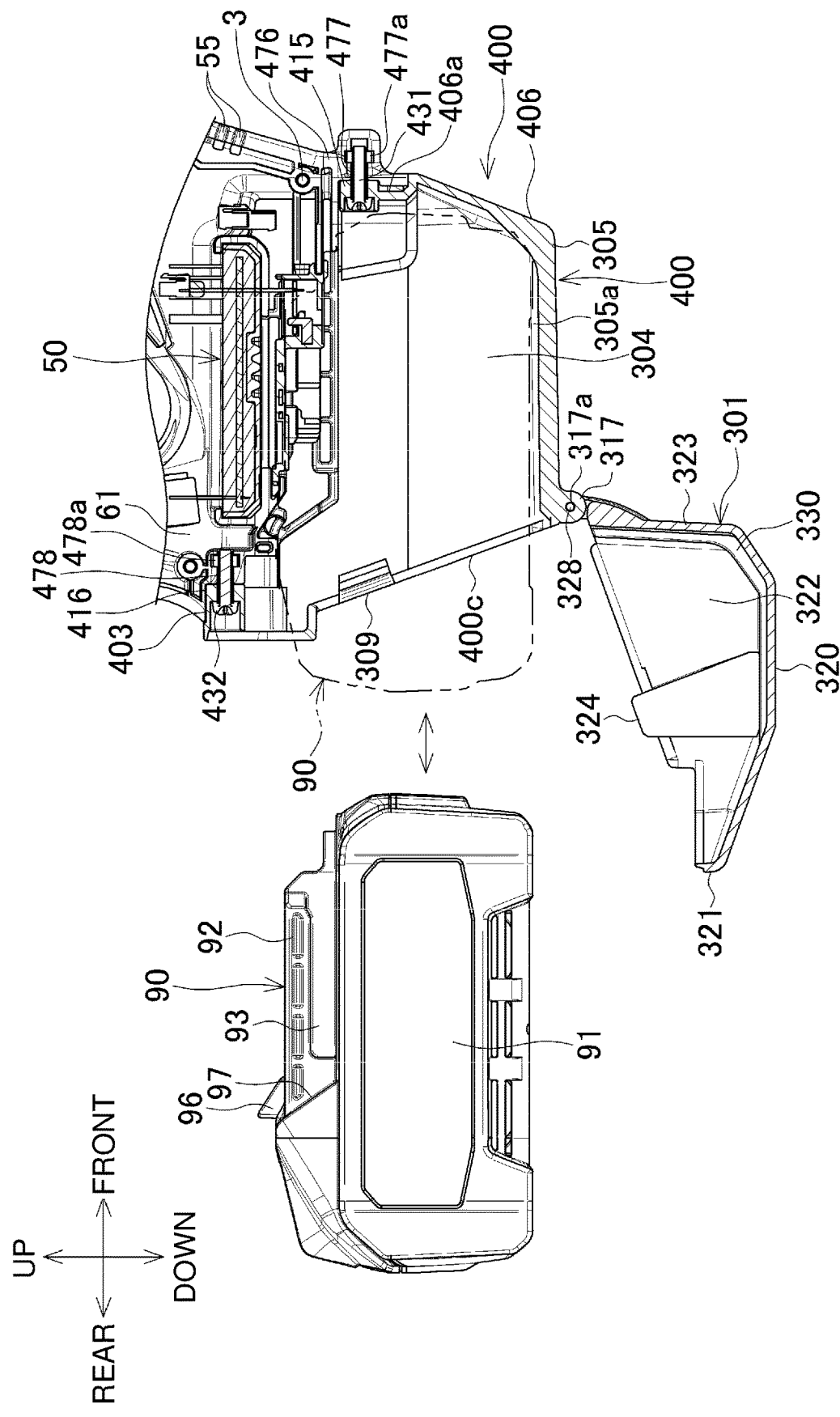
FIG. 26 is a diagram describing the battery pack being attached to or detached from the battery holder in the fourth embodiment.

FIG. 22 is an enlarged perspective view of an example of a battery cover fastened by screwing to a battery holder in a concrete vibrator according to a fourth embodiment. The example in the fourth embodiment differs from the example in the third embodiment. FIG. 23 is a longitudinal central sectional view of FIG. 22. FIG. 24 is a perspective view of the battery holder, the battery cover, and a battery pack as viewed from the rear. FIG. 25 is a perspective view of the battery holder, the battery cover, and the battery pack as viewed from the front. FIG. 26 is a diagram describing the battery pack being attached to or detached from the battery holder in the fourth embodiment.

The fourth embodiment is the same as the third embodiment except screwing structures in the battery holder and the battery cover. The same components and portions as in the third embodiment are given the same reference numerals and will not be described repeatedly.

A front wall 476 in a battery holder 407 in the fourth embodiment has a first screw hole 477 at its center. The first screw hole 477 extends frontward from the rear surface of the front wall 476. In other words, the first screw hole 477 extends in the battery holder 407 (body housing 2). The first screw hole 477 receives a first nut 477a.

An upper wall 475 in the battery holder 407 has a second screw hole 478 in its rear end. The second screw hole 478 extends frontward from the rear surface of the rear end of the upper wall 475. In other words, the second screw hole 478 extends in the battery holder 407 (body housing 2). The second screw hole 478 receives a second nut 478a.

A battery cover 408 in the fourth embodiment includes a front body cover 400 and a rear openable cover 301. The openable cover 301 opens or closes the rear of the body cover 400.

A front overlap 406a in a front plate 406 in the body cover 400 has a first cover screw hole portion 415 at its center. The first cover screw hole portion 415 is a cylinder protruding frontward and rearward from its surrounding portion. The first cover screw hole portion 415 can overlap the first screw hole 477 in the battery holder 407 from the rear.

An upper plate 403 in the body cover 400 extends upward, downward, rightward, and leftward and is connected to side plates 304 in its lower right and left portions. The upper plate 403 has an overlap 403a. The upper plate 403 has, at its center, a second cover screw hole portion 416 in addition to the overlap 403a. The second cover screw hole portion 416 is a cylinder protruding frontward similarly to the overlap 403a. The second cover screw hole portion 416 can overlap the second screw hole 478 in the battery holder 407 from the rear.

The battery cover 408 is slid from the rear of the battery holder 407, and then held by the battery holder 407 by fastening with a first screw 431 and a second screw 432. Before a battery pack 90 is attached, the battery cover 408 is placed to have the front plate 406 in the body cover 400 facing frontward, and the right and left slide rails 314 are fitted between the outer guide rails 81 on the right and left guide plates 80. As shown in FIG. 22, when the battery cover 408 is slid forward, the right and left side plates 304 come in contact with side walls 78 of the battery holder 407. As shown in FIG. 23, the front plate 406 at this position has its first cover screw hole portion 415 located behind the first screw hole 477 in the front wall 476. The upper plate 403 at this position has its second cover screw hole portion 416 located behind the second screw hole 478 in the upper wall 475.

With the openable cover 301 being open, the first screw 431 extends through both the first cover screw hole portion 415 and the first screw hole 477 from the rear, or from inside the battery cover 408. The first screw 431 is fastened with the first nut 477a.

With the openable cover 301 being open, the second screw 432 extends through both the second cover screw hole portion 416 and the second screw hole 478 from the rear, or from inside the battery cover 408. The second screw 432 is fastened with the second nut 478a. The battery cover 408 is thus attached to the battery holder 407. Both the first screw 431 and the second screw 432 are located in the internal space of the battery holder 407 and the battery cover 408.

To detach the battery cover 408, the openable cover 301 is open. The first screw 431 and the second screw 432 are then unscrewed to allow the body cover 400 to be slid rearward.

To attach the battery pack 90, the openable cover 301 is at the open position. As indicated by a two-dot chain line in FIG. 26, the battery pack 90 is placed through an opening 400c in the body cover 400 to be attached to the battery holder 407 in a slidable manner. As shown in FIGS. 22 and 23, when the battery pack 90 is attached and then the openable cover 301 is rotated to the closed position, the battery pack 90 is covered entirely by the battery cover 408.

To detach the battery pack 90, the openable cover 301 alone is rotated to the open position, which exposes the rear of the battery pack 90. When a hook button 95 is pressed to disengage a hook 96 from a battery recess 86, the battery pack 90 can be slid rearward to be detached.

This allows the battery pack 90 to be attachable and detachable without the battery cover 408 being detached from the battery holder 407. The opening 400c in the body cover 400 is located on a path along which the battery pack 90 is attached or detached. With the openable cover 301 at the open position, the battery pack 90 can thus be attachable and detachable without being in contact with the battery cover 408.

In the same manner as in the third embodiment, the battery holder 407 in the fourth embodiment selectively receives one of two or more types of batteries and one of two or more types of battery covers in a detachable manner.

The battery holder 407 in the fourth embodiment also receives the battery pack 90 after receiving the battery cover 408. The battery pack 90 thus prevents the battery cover 408 from slipping off. The battery cover 408 in the fourth embodiment also has the front plate 406 in the body cover 400. This allows the battery holder 407 to have the shorter front wall 476, downsizing the battery holder 407 and the body housing 2.

In the concrete vibrator according to the fourth embodiment, the battery cover 408 is fastened to the battery holder 407 with the first screw 431 and the second screw 432.

The battery cover 408 is thus easily attached to or detached from the battery holder 407 by screwing or unscrewing the first screw 431 and the second screw 432 with a screwdriver. The battery cover 408 is attached more firmly in this state than attached by engaging the two engaging portions with the two receiving portions or by fastening with the single screw.

The first screw 431 and the second screw 432 are entirely located in the internal space of the battery cover 408 and the battery holder 407. This structure can prevent the first screw 431 and the second screw 432 from being covered by concrete or other materials. For concrete or other materials adhering to the battery cover 408 and the battery holder 407, this structure allows the battery cover 408 to be detached by unscrewing the first screw 431 and the second screw 432.

The battery cover 408 has the multiple screws or the first screw 431 and the second screw 432. This structure attaches the battery cover 408 to the battery holder 407 more firmly while the battery cover 408 remains detachable.

The concrete vibrator according to the fourth embodiment may be modified in the same manner as the modifications according to the first, second, and third embodiments as appropriate.

Three or more screws and screwing portions may be used. For fastening a screw, a screw groove located at the first screw hole 477 may be used rather than the nut.

REFERENCE SIGNS LIST 1 rechargeable concrete vibrator
2 body housing
4 motor compartment
5 controller compartment
6 grip
7, 307, 407 battery holder
8, 8A, 308, 408 battery cover
10 motor
50 controller
65 switch
75 upper wall
76 front wall
77 body cover recess
80 guide plate
83 terminal mount
90, 90A battery pack
100, 100A body cover
101, 101A openable cover
103 upper plate
104 side plate
105 lower plate
106 front plate
107 openable cover recess
109 hook plate
112 body engaging tab
120 rear plate
121 rear upper plate 122 rear side plate
123 rear lower plate
124 cover engaging tab
140 mixer
331 screw
431 first screw (screw)
432 second screw (screw)

What is claimed is:

1. An electric work machine, comprising:
a motor;
a motor housing accommodating the motor;
a battery holder connected to the motor housing to receive a battery in a detachable manner; and
a battery cover to cover an overall part of the battery held by the battery holder, the battery cover being attachable to and detachable from the battery holder;
wherein
the battery holder receives the battery in a manner slidable in a predetermined linear direction in a detachable manner.

2. The electric work machine according to claim 1, wherein
the battery holder selectively receives a first battery or a second battery larger than the first battery in a detachable manner,
the battery cover includes a first battery cover to cover the first battery and a second battery cover to cover the second battery, and
the battery holder selectively receives the first battery cover or the second battery cover in a detachable manner.

3. The electric work machine according to claim 1, wherein
the battery cover is attachable to and detachable from the battery holder in a manner slidable in the same predetermined linear direction as the battery.

4. The electric work machine according to claim 1, wherein
the battery holder includes a guide rail extending in the predetermined linear direction, and
the battery cover includes a slide rail extending in the predetermined linear direction, and the slide rail is engageable with the guide rail.

5. The electric work machine according to claim 1, further comprising:
an engaging portion in the battery cover or in the battery holder; and
a receiving portion engageable with the engaging portion with the battery cover being attached.

6. The electric work machine according to claim 5, wherein
the engaging portion includes a hook.

7. The electric work machine according to claim 1, wherein
the battery cover includes:
an opening allowing the battery to be attachable and detachable with the battery cover being attached to the battery holder, and
a cover to open or close the opening;
the opening is located on a path along which the battery is attached to or detached from the battery holder.

8. The electric work machine according to claim 1, wherein
the battery cover includes
an opening allowing the battery to be attachable and detachable with the battery cover being attached to the battery holder, and
a cover to open or close the opening.

9. An electric work machine, comprising:
a motor;
a motor housing accommodating the motor;
a battery holder connected to the motor housing to receive a battery in a detachable manner; and
a battery cover to cover an overall part of the battery held by the battery holder, the battery cover being attachable to and detachable from the battery holder, wherein
the battery cover is fastened to the battery holder with at least one screw.

10. The electric work machine according to claim 9, wherein
the at least one screw is entirely located in an internal space of the battery cover and in an internal space of the battery holder.

11. The electric work machine according to claim 9, wherein
the at least one screw comprises a plurality of screws.

12. An electric work machine, comprising:
a motor;
a motor housing accommodating the motor; and
a battery holder connected to the motor housing to receive a battery in a detachable manner, the battery holder being configured to selectively receive a first battery or a second battery larger than the first battery in a detachable manner, the battery holder being configured to selectively receive a first battery cover to cover an overall part of the first battery or a second battery cover to cover an overall part of the second battery in a detachable manner.

13. The electric work machine according to claim 12, wherein
the battery holder receives the first battery or the second battery in a manner slidable in a predetermined linear direction in a detachable manner.

14. The electric work machine according to claim 13, wherein
the first battery cover is attachable to and detachable from the battery holder in a manner slidable in the same predetermined linear direction as the first battery, and
the second battery cover is attachable to and detachable from the battery holder in a manner slidable in the same predetermined linear directions the second battery.

15. The electric work machine according to claim 13, wherein
the battery holder includes a guide rail extending in the predetermined linear direction, and
the first battery cover and the second battery cover each have a slide rail extending in the predetermined linear direction, and the slide rail is engageable with the guide rail.

16. The electric work machine according to claim 12, further comprising:
an engaging portion located in both the first battery cover and the second battery cover or located in the battery holder; and
a receiving portion engageable with the engaging portion with the first battery cover or the second battery cover being attached.

17. The electric work machine according to claim 16, wherein
the engaging portion includes a hook.

18. The electric work machine according to claim 12, wherein
the first battery cover or the second battery cover is fastened to the battery holder with at least one screw.

19. An electric work machine, comprising:
a motor;
a motor housing accommodating the motor;
a battery holder connected to the motor housing to receive a battery in a detachable manner; and
a battery cover to cover an overall part of the battery held by the battery holder, the battery cover being attachable to and detachable from the battery holder, wherein
the battery holder receiving the battery cover allows the battery to be received, and
the battery holder receiving the battery prevents the battery cover from being received.

20. The electric work machine according to claim 19, wherein
the battery cover is hinged to the battery holder in an openable manner.

21. An electric work machine, comprising:
a motor;
a motor housing accommodating the motor;
a battery holder connected to the motor housing to receive a battery in a detachable manner;
a battery cover to cover an overall part of the battery held by the battery holder, the battery cover being attachable to and detachable from the battery holder;
an engaging portion in the battery cover or in the battery holder; and
a receiving portion engageable with the engaging portion with the battery cover being attached,
wherein the engaging portion includes a hook.

22. An electric work machine, comprising:
a motor;
a motor housing accommodating the motor;
a battery holder connected to the motor housing to receive a battery in a detachable manner; and
a battery cover to cover an overall part of the battery held by the battery holder, the battery cover being attachable to and detachable from the battery holder,
wherein
the battery cover is fastened to the battery holder with at least one screw, and
the at least one screw is entirely located in an internal space of the battery cover and in an internal space of the battery holder.

* * * * *